(12) United States Patent
Fujishiro et al.

(10) Patent No.: US 10,588,111 B2
(45) Date of Patent: Mar. 10, 2020

(54) BASE STATION, MOBILITY MANAGEMENT APPARATUS, RADIO TERMINAL, AND NETWORK APPARATUS

(71) Applicant: KYOCERA CORPORATION, Kyoto (JP)

(72) Inventors: Masato Fujishiro, Yokohama (JP); Hiroyuki Adachi, Kawasaki (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 220 days.

(21) Appl. No.: 15/890,979

(22) Filed: Feb. 7, 2018

(65) Prior Publication Data

US 2018/0176883 A1    Jun. 21, 2018

Related U.S. Application Data

(63) Continuation of application No. PCT/JP2016/069321, filed on Jun. 29, 2016.

(60) Provisional application No. 62/251,430, filed on Nov. 5, 2015, provisional application No. 62/222,888, filed on Jun. 24, 2015, provisional application No. 62/203,650, filed on Aug. 11, 2015.

(51) Int. Cl.
```
H04W 76/28    (2018.01)
H04W 68/02    (2009.01)
H04W 68/00    (2009.01)
H04W 52/02    (2009.01)
```

(52) U.S. Cl.
CPC ....... *H04W 68/02* (2013.01); *H04W 52/0206* (2013.01); *H04W 52/0216* (2013.01); *H04W 52/0225* (2013.01); *H04W 68/00* (2013.01); *H04W 76/28* (2018.02); *Y02D 70/126* (2018.01); *Y02D 70/1242* (2018.01); *Y02D 70/1262* (2018.01); *Y02D 70/21* (2018.01); *Y02D 70/24* (2018.01)

(58) Field of Classification Search
None
See application file for complete search history.

(56) References Cited

U.S. PATENT DOCUMENTS

2012/0020393 A1    1/2012 Patil et al.
2012/0300685 A1    11/2012 Kim et al.
(Continued)

FOREIGN PATENT DOCUMENTS

JP    2013-535902 A    9/2013
WO    2014/181981 A1    11/2014

OTHER PUBLICATIONS

International Search Report issued in PCT/JP2016/069321; dated Sep. 20, 2016.
(Continued)

*Primary Examiner* — Ayanah S George
(74) *Attorney, Agent, or Firm* — Studebaker & Brackett PC

(57) ABSTRACT

A base station according to a first aspect includes a controller configured to perform a process of receiving, from a mobility management apparatus, a paging message used for paging of a radio terminal. The paging message includes a first field for idle mode non-extended DRX and a second field for idle mode extended DRX. If information indicating a DRX cycle of the idle mode extended DRX is included in the second field, the controller is configured to determine that the idle mode extended DRX is configured to the radio terminal.

9 Claims, 17 Drawing Sheets

(56) References Cited

U.S. PATENT DOCUMENTS

2015/0282083 A1* 10/2015 Jeong ................ H04W 52/0216
370/311
2016/0295504 A1* 10/2016 Wang .................... H04W 52/02

OTHER PUBLICATIONS

3rd Generation Partnership Project; Technical Specification Group Services and System Aspects; Study on System Impacts of Extended DRX Cycle for Power Consumption Optimization; 3GPP TR 23.770 V1.1.0; Jun. 2015; pp. 1-13; Release 13; 3GPP Organizational Partners.

3rd Generation Partnership Project; Technical Specification Group Radio Access Network; Evolved Universal Terrestrial Radio Access Network (E-UTRAN); S1 Application Protocol (S1AP); 3GPP TS 36.413 V12.6.0; Jun. 2015; pp. 1-5; Release 12; 3GPP Organizational Partners.

Qualcomm Incorporated et al.; Design considerations for extended DRX in LTE; 3GPP TSG-RAN WG2 Meeting #90bis; R2-152342; May 25-29, 2015; pp. 1-6; Fukuoka, Japan.

3rd Generation Partnership Project; Technical Specification Group Radio Access Network; Evolved Universal Terrestrial Radio Access (E-UTRA); User Equipment (UE) procedures in idle mode; 3GPP TS 36.304 V12.5.0; Jun. 2015; pp. 1-3; Release 12; 3GPP Organizational Partners.

MediaTek Inc.; Remaining Issues for Idle Mode DRX Extension in LTE; 3GPP TSG-RAN WG2 Meeting #91bis; R2-154421; Oct. 5-9, 2015; pp. 1-3; Malmö, Sweden.

* cited by examiner

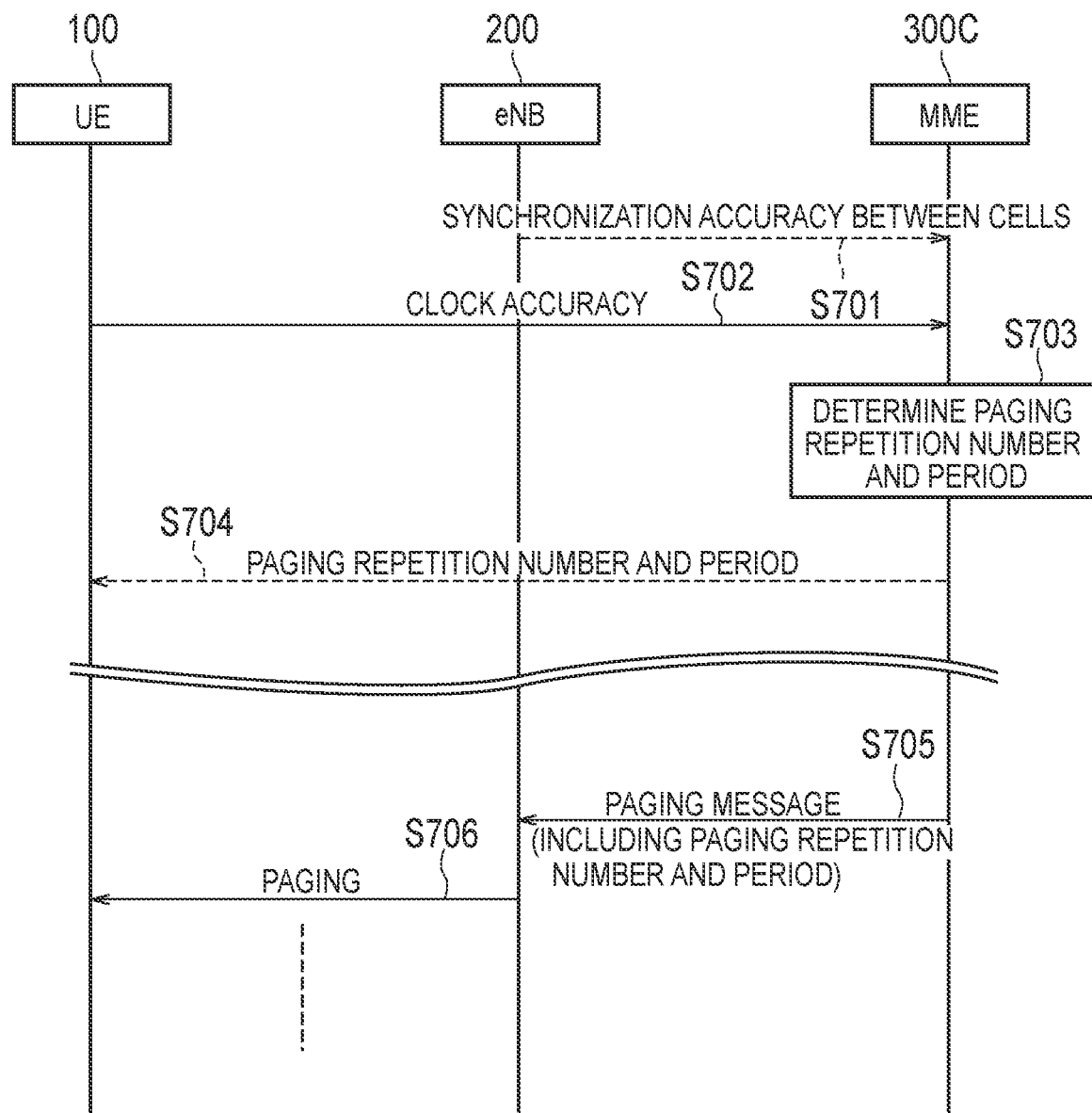

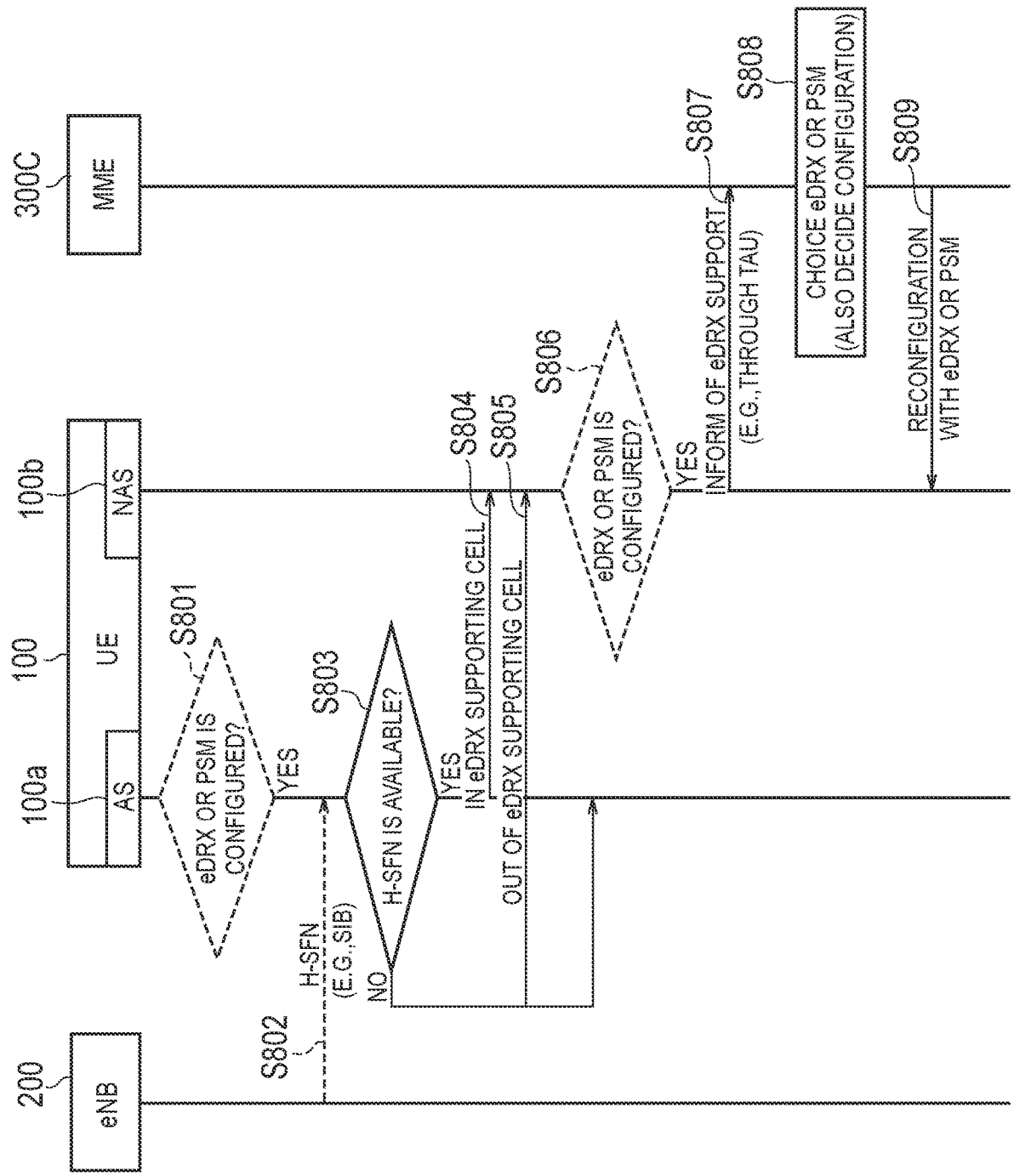

BASE STATION, MOBILITY MANAGEMENT APPARATUS, RADIO TERMINAL, AND NETWORK APPARATUS

RELATED APPLICATION

This application is a continuation application of international application PCT/JP2016/069321, filed Jun. 29, 2016, which claims the benefit of U.S. Patent Provisional Application No. 62/203,650 (filed on Aug. 11, 2015), U.S. Patent Provisional Application No. 62/222,888 (filed on Sep. 24, 2015), and U.S. Patent Provisional Application No. 62/251,430 (filed on Nov. 5, 2015), the entire contents of which are incorporated herein by reference.

TECHNICAL FIELD

The present disclosure relates to a base station, a mobility management apparatus, a radio terminal, and a network apparatus in a mobile communication system.

BACKGROUND ART

In a mobile communication system, discontinuous reception (DRX) is used as an intermittent reception technique for reducing power consumption of a radio terminal.

A radio terminal in an idle mode can perform a DRX operation to monitor paging at paging reception opportunity (paging occasion) occurring at a predetermined time interval (DRX cycle). Except for the paging reception opportunity, the radio terminal is in a sleep state, and thus the power consumption of the radio terminal is reduced.

In recent years, machine type communication (MTC), in which a radio terminal communicates without intervention of a person in a mobile communication system, has attracted attention. From this background, it is studied to introduce an extended DRX (eDRX) cycle that is longer than the existing DRX cycle so as to further reduce the power consumption of the radio terminal.

SUMMARY

A base station according to a first aspect includes: a controller configured to perform a process of receiving, from a mobility management apparatus, a paging message used for paging of a radio terminal. The paging message includes a first field for idle mode non-extended DRX and a second field for idle mode extended DRX. If information indicating a DRX cycle of the idle mode extended DRX is included in the second field, the controller is configured to determine that the idle mode extended DRX is configured to the radio terminal.

A mobility management apparatus according to a second aspect includes: a controller configured to perform a process of transmitting, to a base station, a paging message used for paging of a radio terminal. The paging message includes a first field for idle mode non-extended DRX and a second field for idle mode extended DRX. If the idle mode extended DRX is configured to the radio terminal, the controller includes information indicating a DRX cycle of the idle mode extended DRX in the second field.

A base station according to a third aspect includes: a controller configured to perform repeated transmission of paging at two or more paging reception opportunities of a radio terminal if an idle mode extended discontinuous reception (DRX) is configured to the radio terminal. The two or more paging reception opportunities include a specific paging reception opportunity corresponding to a wake-up timing in the idle mode extended DRX and a next paging reception opportunity of the specific paging reception opportunity.

A radio terminal according to a fourth aspect includes: a controller configured to perform a process of receiving a system information block from a base station after an idle mode extended DRX is configured to the radio terminal. If the idle mode extended DRX is supported, the system information block includes information indicating that the base station supports the idle mode extended DRX. If the base station does not support the idle mode extended DRX, the controller is configured to perform a process of stopping the operation of the idle mode extended DRX.

A radio terminal according to a fifth aspect is configured to determine a paging frame that is a radio frame including a paging occasion of the radio terminal and determine a predetermined subframe of the paging frame as the paging occasion. The radio terminal includes: a controller configured to determine a paging hyper-frame that is a hyper-frame including the paging frame from a plurality of hyper-frames each including a predetermined number of radio frames. The controller is configured to determine the paging hyper-frame by using a third calculation formula defined separately of a first calculation formula used for determining the paging frame and a second calculation formula used for determining the paging occasion.

BRIEF DESCRIPTION OF DRAWINGS

FIG. 18 is a diagram illustrating an example of an operation according to the seventh embodiment.

FIG. 19 is a diagram illustrating an example of an operation according to an eighth embodiment.

DESCRIPTION OF EMBODIMENTS

Overview of Embodiments

Figure 1:
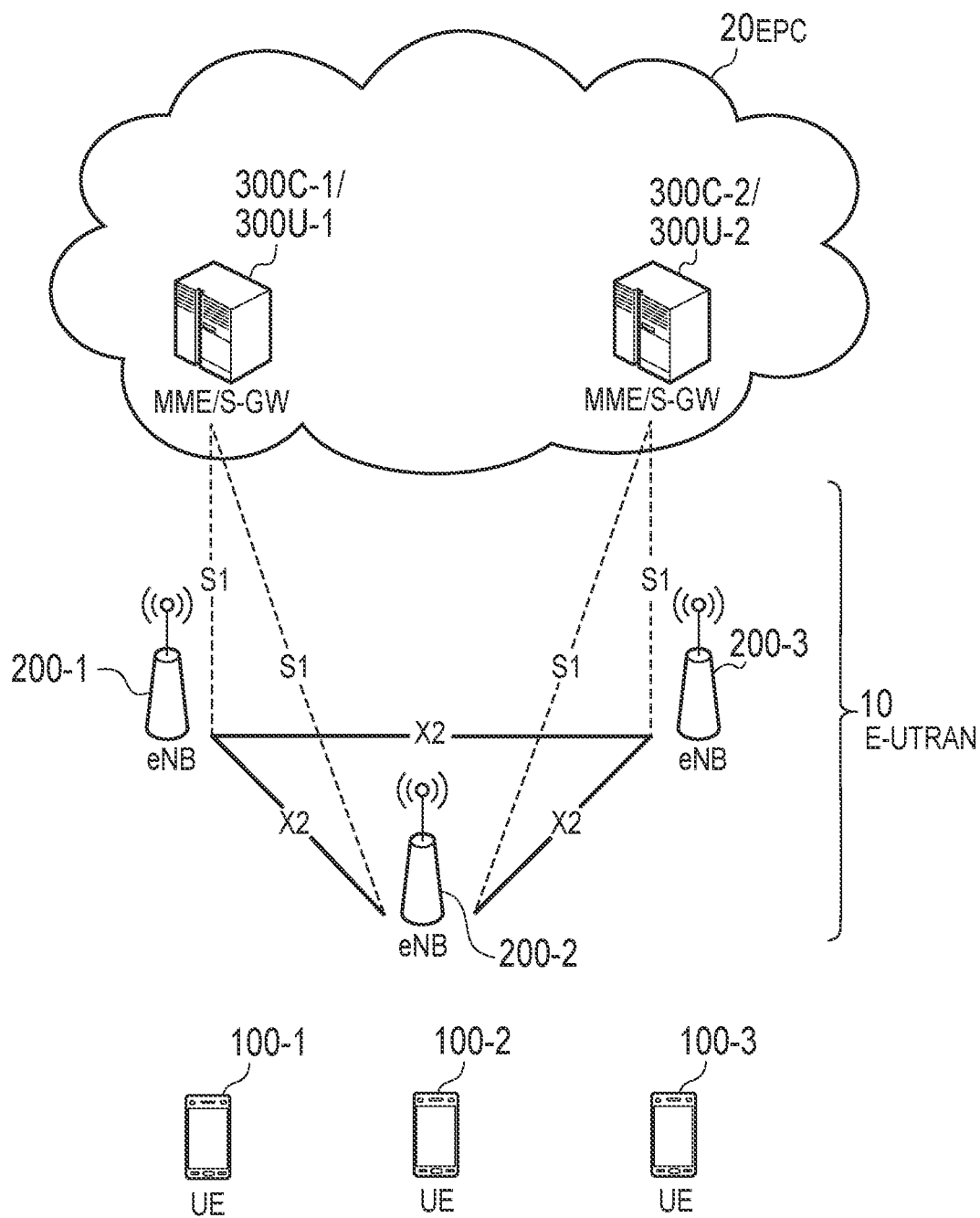
FIG. 1 is a diagram illustrating an architecture of an LTE system (mobile communication system).

A radio terminal according to a first embodiment includes a controller configured to, after an idle mode extended DRX is configured from a core network apparatus to the radio terminal, perform a process of transmitting, to a base station, information for releasing a connection between the radio terminal and the base station in a connected mode.

In the radio terminal according to the first embodiment, if the controller confirms that there is no communication data of the radio terminal in the connected mode, the controller may perform a process of transmitting the information to the base station.

The core network apparatus according to the first embodiment includes a controller configured to, after the core network apparatus configures the idle mode extended DRX to the radio terminal, perform a process of transmitting, to the base station, information for releasing the connection between the radio terminal and the base station in the connected mode.

In the core network apparatus according to the first embodiment, if the controller confirms that there is no communication data of the radio terminal in the connected mode, the controller may perform a process of transmitting the information to the base station.

The radio terminal according to the first embodiment includes the controller configured to, after the idle mode extended DRX is configured from the core network apparatus to the radio terminal, start the idle mode extended DRX if the connection between the radio terminal and the base station is released.

In the radio terminal according to the first embodiment, after a timer value of a DRX cycle of the idle mode extended DRX is configured from the core network apparatus, the controller may start the idle mode extended DRX if a timer corresponding to the timer value is running when the connection is released.

A base station according to a second embodiment includes a controller configured to perform a process of receiving, from a core network apparatus, a paging message used for paging of a radio terminal. The paging message includes information about an idle mode extended DRX.

In the base station according to the second embodiment, the paging message may include a first field for idle mode non-extended DRX and a second field for the idle mode extended DRX. If the information indicating the DRX cycle of the idle mode extended DRX is included in the second field, the controller determines that the idle mode extended DRX is configured to the radio terminal.

In the base station according to the second embodiment, the paging message may include information indicating the DRX cycle configured to the radio terminal. The controller determines that the idle mode extended DRX is configured to the radio terminal if the DRX cycle indicated by the information is equal to or longer than a specified time.

In the base station according to the second embodiment, the paging message may include time information indicating a reference time for performing the paging. The controller performs the paging based on the time information.

In the base station according to the second embodiment, the paging message may include retransmission control information indicating the number of repeated transmissions of the paging. The controller performs the repeated transmission of the paging based on the retransmission control information.

In the base station according to the second embodiment, the controller may perform a process of transmitting, to the core network apparatus, information indicating whether the base station has the capability of performing the repeated transmission of the paging.

The core network apparatus according to the second embodiment includes the controller configured to perform a process of transmitting, to the base station, the paging message used for paging of the radio terminal. The paging message includes information about an idle mode extended DRX.

In the core network apparatus according to the second embodiment, the controller may perform a process of receiving, from the base station, information indicating whether the base station has the capability of performing the repeated transmission of the paging.

In the core network apparatus according to the second embodiment, if the base station does not have the capability of performing the repeated transmission of the paging, the controller may perform the repeated transmission of the paging message to the base station.

A radio terminal according to a third embodiment includes a controller configured to determine, in an idle mode, paging reception opportunity of the radio terminal based on a first parameter provided from a core network apparatus or a second parameter provided from a base station. If an idle mode extended DRX is configured to the radio terminal, the controller ignores the first parameter and determines the paging reception opportunity based on the second parameter.

A base station according to the third embodiment includes a controller configured to determine, in an idle mode, a paging transmission timing to the radio terminal based on a first parameter provided to the radio terminal by the core network apparatus or a second parameter provided to the radio terminal by the base station. If the idle mode extended DRX is configured to the radio terminal, the controller ignores the first parameter and determines the paging transmission timing based on the second parameter.

A base station according to a fourth embodiment includes a controller configured to perform repeated transmission of paging at two or more paging reception opportunities of a radio terminal if an idle mode extended DRX is configured to the radio terminal. The two or more paging reception opportunities include a specific paging reception opportunity corresponding to a wake-up timing in the idle mode extended DRX and a next paging reception opportunity of the specific paging reception opportunity.

In the base station according to the fourth embodiment, the two or more paging reception opportunities may further include a previous paging reception opportunity of the specific paging reception opportunity.

The radio terminal according to the fourth embodiment includes a controller configured to, after the idle mode extended DRX is configured to the radio terminal, monitor the paging at only one paging reception opportunity for each DRX cycle even if the base station performs the repeated transmission for each DRX cycle in an idle mode extended DRX.

In the radio terminal according to the fourth embodiment, if the paging is not received at the one paging reception opportunity, the controller transitions to a sleep state in the idle mode extended DRX.

A radio terminal according to a fifth embodiment includes a controller configured to, after an idle mode extended DRX is configured to the radio terminal, perform a process of stopping the idle mode extended DRX if a base station that does not support the idle mode extended DRX is detected.

In the radio terminal according to the fifth embodiment, the process may include a process of transmitting, to a core network apparatus, information for requesting the release of the idle mode extended DRX.

A radio terminal according to a sixth embodiment determines a paging frame that is a radio frame including a paging occasion of the radio terminal and determines a predetermined subframe from the paging frame as the paging occasion. The radio terminal includes a controller configured to determine a paging hyper-frame that is a hyper-frame including the paging frame from a plurality of hyper-frames each including a predetermined number of radio frames. The controller determines the paging hyper-frame by using a third calculation formula defined separately of a first calculation formula used for determining the paging frame and a second calculation formula used for determining the paging occasion.

In the radio terminal according to the sixth embodiment, a DRX parameter provided from the base station according to system information is applied to the first calculation formula and the second calculation formula, and a predetermined parameter different from the DRX parameter may be applied to the third calculation formula, without applying the DRX parameter.

In the radio terminal according to the sixth embodiment, the predetermined parameter may include an extended DRX cycle provided from the core network apparatus.

In the radio terminal according to the sixth embodiment, if the hyper-frame number of the paging hyper-frame is indicated by "H-SFN", the number of hyper-frame corresponding to the extended DRX cycle is indicated by "$T_{eDRX}$", and a value based on a value unique to the radio terminal is indicated by "$\alpha$", the third calculation formula may be H-SFN mod $T_{eDRX}$=$\alpha$ mod $T_{eDRX}$.

In the radio terminal according to the sixth embodiment, a may be a value of a remainder obtained by dividing a value unique to the radio terminal by the upper limit value of the hyper-frame number.

In the radio terminal according to the sixth embodiment, if a plurality of paging frames are determined by using the first calculation formula, the controller may perform a process of receiving paging only in the first paging frame among the plurality of paging frames in the paging hyper-frame determined by using the third calculation formula.

The network apparatus according to the sixth embodiment determines a paging frame that is a radio frame including a paging occasion of the radio terminal and determines a predetermined subframe from the paging frame as the paging occasion. The base station includes a controller configured to determine a paging hyper-frame that is a hyper-frame including the paging frame from a plurality of hyper-frames each including a predetermined number of radio frames. The controller determines the paging hyper-frame by using a third calculation formula defined separately of a first calculation formula used for determining the paging frame and a second calculation formula used for determining the paging occasion.

The network apparatus according to the sixth embodiment is a base station, and if a plurality of paging frames are determined by using the first calculation formula, the controller may perform a process of transmitting paging only in the first paging frame among the plurality of paging frames in the paging hyper-frame determined using the third calculation formula.

A radio terminal according to a seventh embodiment is a radio terminal in a mobile communication system. The radio terminal includes a clock generator configured to generate an operation clock of the radio terminal, and a controller configured to notify a network of accuracy information about clock accuracy of the clock generator.

In the radio terminal according to the seventh embodiment, the accuracy information may be used by the network to determine at least one of a paging repetition number and a paging repetition period for the radio terminal.

In the radio terminal according to the seventh embodiment, the controller may notify the network of the accuracy information as a part of capability information indicating the capability of the radio terminal.

In the radio terminal according to the seventh embodiment, when reporting allowable latency information indicating an allowable latency of an application executed by the radio terminal to the network, the controller may notify the network of the accuracy information.

In the radio terminal according to the seventh embodiment, the controller may further notify the network of at least one of the paging repetition number and the paging repetition period required for the allowable latency.

The network apparatus according to the seventh embodiment is a network apparatus used for a network of a mobile communication system. The network apparatus includes a controller configured to receive accuracy information transmitted from a radio terminal and determine at least one of a paging repetition number and a paging repetition period for the radio terminal based on the accuracy information. The accuracy information is information about clock accuracy of a clock generator that generates an operation clock of the radio terminal.

In the network apparatus according to the seventh embodiment, the controller may determine at least one of the paging repetition number and the paging repetition period, based on the accuracy information and the extended discontinuous reception (DRX) cycle configured to the radio terminal.

In the network apparatus according to the seventh embodiment, the controller may determine at least one of the paging repetition number and the paging repetition period, based on the accuracy information, the extended DRX cycle, and synchronization accuracy between cells in the network.

The network apparatus according to the seventh embodiment is a mobility management apparatus, and the controller may notify at least one of the paging repetition number and the paging repetition period to the base station provided in the network.

A radio terminal according to an eighth embodiment is a radio terminal in a mobile communication system. The radio terminal includes a controller configured to perform, in an idle mode, one of a DRX operation in which an extended discontinuous reception (DRX) cycle is not applied and an extended DRX operation to which the extended DRX cycle is applied. If the radio terminal exists in an area where the extended DRX operation is not supported, the controller performs a specific power saving operation configured by the mobility management apparatus, without applying the extended DRX operation.

In the radio terminal according to the eighth embodiment, the specific power saving operation may be a power saving mode (PSM) defined by the specification of non-access stratum (NAS).

In the radio terminal according to the eighth embodiment, the controller may include an access stratum (AS) entity for communicating with the base station and a NAS entity for communicating with the mobility management apparatus, and the AS entity may notify the NAS entity whether the area where the radio terminal exists supports the extended DRX operation.

In the radio terminal according to the eighth embodiment, if the radio terminal exists in the area where the extended DRX operation is not supported and the extended DRX operation is configured to the radio terminal, the AS entity may notify the NAS entity that the radio terminal exists in the area where the extended DRX operation is not supported.

In the radio terminal according to the eighth embodiment, if the NAS entity is notified by the AS entity that the radio terminal exists in the area where the extended DRX operation is not supported, the NAS entity may perform a first process or a second process. The first process is a process of notifying the mobility management apparatus that the radio terminal exists in the area where the extended DRX operation is not supported. The second process is a process of requesting the mobility management apparatus to configure the PSM.

In the radio terminal according to the eighth embodiment, the NAS entity may perform the first process or the second process when a tracking area update is notified to the mobility management apparatus.

In the radio terminal according to the eighth embodiment, if the radio terminal exists in the area where the extended DRX operation is supported and the PSM is configured to the radio terminal, the AS entity may notify the NAS entity that the radio terminal exists in the area where the extended DRX operation is supported.

In the radio terminal according to the eighth embodiment, if the NAS entity is notified by the AS entity that the radio terminal exists in the area where the extended DRX operation is supported, the NAS entity may perform a third process or a fourth process. The third process is a process of notifying the mobility management apparatus that the radio terminal exists in the area where the extended DRX operation is supported. The fourth process is a process of requesting the mobility management apparatus to configure the extended DRX operation.

In the radio terminal according to the eighth embodiment, the NAS entity may perform the third process or the fourth process when a tracking area update is notified to the mobility management apparatus.

In the radio terminal according to the eighth embodiment, the specific power saving operation is a special DRX operation using a special DRX cycle different from the extended DRX cycle and the DRX cycle used for the DRX operation, and the special DRX cycle may be configured by the mobility management apparatus.

In the radio terminal according to the eighth embodiment, the special DRX cycle may be longer than the DRX cycle and shorter than the extended DRX cycle.

[Architecture of Mobile Communication System]

Hereinafter, an architecture of a Long Term Evolution (LTE) system that is a mobile communication system according to an embodiment will be described.

(1) Entire System Architecture

FIG. 1 is a diagram illustrating an architecture of an LTE system.

As illustrated in FIG. 1, the LTE system includes a user equipment (UE) 100, an evolved-UMTS terrestrial radio access network (E-UTRAN) 10, and an evolved packet core (EPC) 20.

The UE 100 corresponds to a radio terminal. The UE 100 is a mobile communication device and performs radio communication with a cell (serving cell). The architecture of the UE 100 will be described later.

The E-UTRAN 10 corresponds to a radio access network. The E-UTRAN 10 includes an evolved Node-B (eNB) 200. The eNB 200 corresponds to a base station. The eNBs 200 are connected to each other via an X2 interface. The architecture of the eNB 200 will be described later.

The eNB 200 manages one or more cells and performs radio communication with the UE 100 having established the connection to the cell. The eNB 200 has a radio resource management (RRM) function, a user data (hereinafter, simply referred to as "data") routing function, a measurement control function for mobility control and scheduling, and the like. It is noted that the "cell" is used as the term indicating a minimum unit of a radio communication area and is also used as the term indicating a function of performing radio communication with the UE 100.

The EPC 20 corresponds to a core network. The EPC 20 includes a mobility management entity (MME) 300C and a serving-gateway (S-GW) 300U. The MME 300C is a mobility management apparatus that performs a variety of mobility control or the like on the UE 100. The MME 300C may be referred to as a core network apparatus. The S-GW 300U performs data transfer control. The MME/S-GW 300 is connected to the eNB 200 via an S1 interface. The E-UTRAN 10 and the EPC 20 constitute a network.

(2) Structure of Radio Protocol

Figure 2:
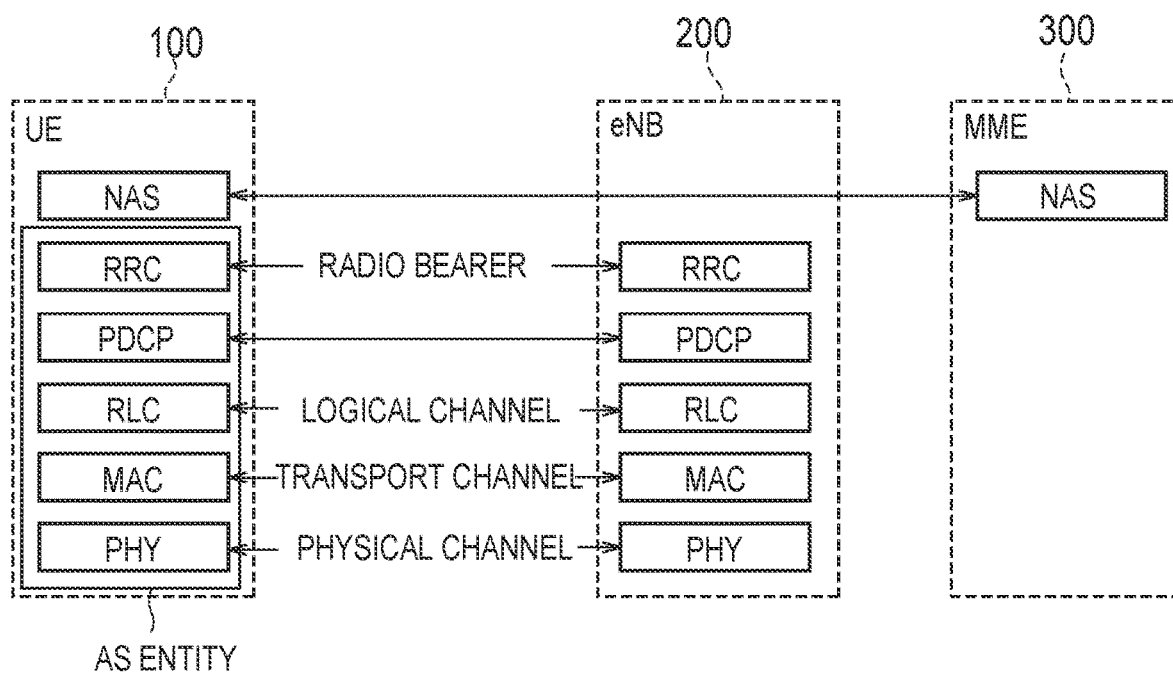
FIG. 2 is a protocol stack diagram of a radio interface in the LTE system.

FIG. 2 is a protocol stack diagram of a radio interface in the LTE system.

As illustrated in FIG. 2, a radio interface protocol is divided into a first layer to a third layer of an OSI reference model, and the first layer is a physical (PHY) layer. The second layer includes a medium access control (MAC) layer, a radio link control (RLC) layer, and a packet data convergence protocol (PDCP) layer. The third layer includes a radio resource control (RRC) layer.

The PHY layer performs coding and decoding, modulation and demodulation, antenna mapping and demapping, and resource mapping and demapping. Data and control signals are transmitted between the PHY layer of the UE 100 and the PHY layer of the eNB 200 via a physical channel.

The MAC layer performs priority control of data, a retransmission process by hybrid ARQ (HARQ), a random access procedure, and the like. Data and control signals are transmitted between the MAC layer of the UE 100 and the MAC layer of the eNB 200 via a transport channel. The MAC layer of the eNB 200 includes a scheduler that determines uplink and downlink transport formats (transport block size, modulation and coding scheme (MCS)) and resource blocks allocated to the UE 100.

The RLC layer transmits data to the RLC layer on the receiving side by using the functions of the MAC layer and the PHY layer. Data and control signals are transmitted between the RLC layer of the UE 100 and the RLC layer of the eNB 200 via a logical channel.

The PDCP layer performs header compression and decompression, and encryption and decryption.

The RRC layer is defined only in a control plane that handles the control signals. A message (RRC message) for various configurations is transmitted between the RRC layer of the UE 100 and the RRC layer of the eNB 200. The RRC layer controls logical channels, transport channels, and physical channels in response to establishment, re-establishment, and release of radio bearers. If there is a connection (RRC connection) between the RRC of the UE 100 and the RRC of the eNB 200, the UE 100 is in an RRC connected mode (connected mode); otherwise, the UE 100 is in an RRC idle mode (idle mode).

A non-access stratum (NAS) layer, which is located above the RRC layer, performs session management, mobility management, and the like. The UE 100 and the MME 300C transmit and receive a NAS message.

In the UE 100, the physical (PHY) layer, the MAC layer, the RLC layer, the PDCP layer, and the RRC layer constitute an access stratum (AS) entity that communicates with the eNB 200. The NAS layer constitutes a NAS entity that communicates with a core network apparatus such as the MME 300C.

(3) Architecture of Radio Terminal

Figure 3:
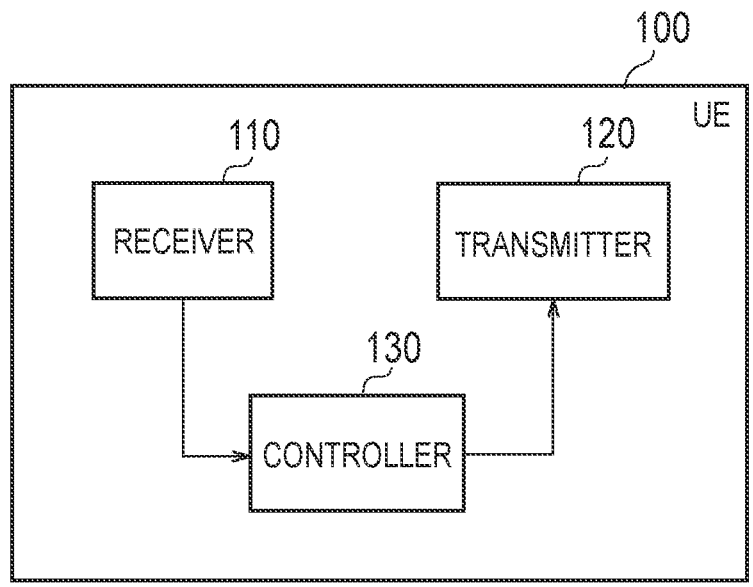
FIG. 3 is a block diagram of a UE (radio terminal).

FIG. 3 is a block diagram of the UE 100 (radio terminal). As illustrated in FIG. 3, the UE 100 includes a receiver 110, a transmitter 120, and a controller 130.

The receiver 110 performs a variety of reception under the control of the controller 130. The receiver 110 includes an antenna and a receiving set. The receiving set converts a radio signal received by the antenna into a baseband signal (reception signal) and outputs the baseband signal to the controller 130.

The transmitter 120 performs a variety of transmission under the control of the controller 130. The transmitter 120 includes an antenna and a transmitting set. The transmitting set converts a baseband signal (transmission signal) output by the controller 130 into a radio signal and transmits the radio signal from the antenna.

The controller 130 performs a variety of control on the UE 100. The controller 130 includes a processor and a memory. The memory stores a program executed by the processor, and information used for processing by the processor. The processor includes a baseband processor that performs modulation and demodulation, coding and decoding, and the like of the baseband signal, and a central processing unit (CPU) that performs a variety of processes by executing a program stored in the memory. The processor may include a codec that performs coding and decoding of an audio or video signal. The processor performs the various communication protocols described above and various processes to be described later.

(4) Architecture of Base Station

Figure 4:
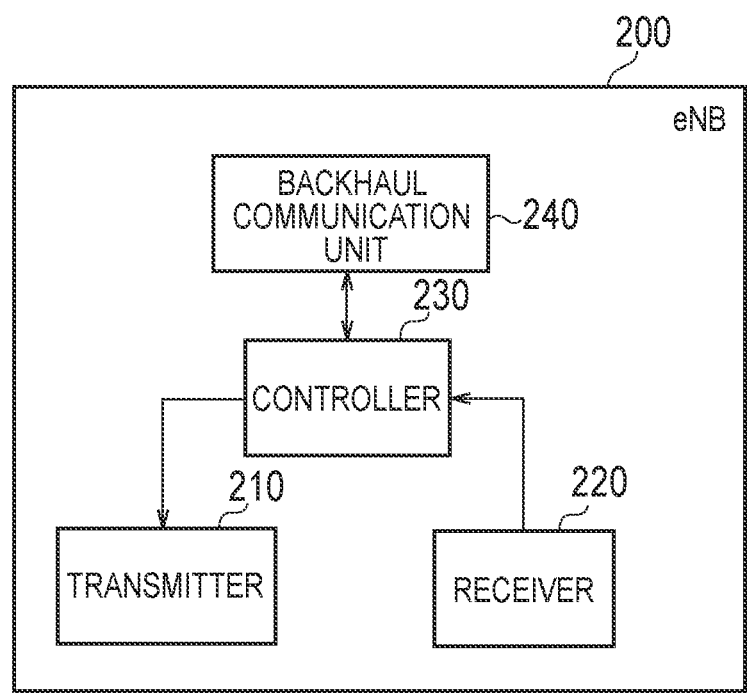
FIG. 4 is a block diagram of an eNB (base station).

FIG. 4 is a block diagram of the eNB 200 (base station). As illustrated in FIG. 4, the eNB 200 includes a transmitter 210, a receiver 220, a controller 230, and a backhaul communication unit 240.

The transmitter 210 performs a variety of transmission under the control of the controller 230. The transmitter 210 includes an antenna and a transmitting set. The transmitting set converts a baseband signal (transmission signal) output by the controller 230 into a radio signal and transmits the radio signal from the antenna.

The receiver 220 performs a variety of reception under the control of the controller 230. The receiver 220 includes an antenna and a receiving set. The receiving set converts a radio signal received by the antenna into a baseband signal (reception signal) and outputs the baseband signal to the controller 230.

The controller 230 performs a variety of control on the eNB 200. The controller 230 includes a processor and a memory. The memory stores a program executed by the processor, and information used for processing by the processor. The processor includes a baseband processor that performs modulation and demodulation, coding and decoding, and the like of the baseband signal, and a CPU that performs a variety of processes by executing a program stored in the memory. The processor performs the various communication protocols described above and various processes to be described later.

The backhaul communication unit 240 is connected to the neighbour eNB via an X2 interface and connected to the MME/S-GW 300 via an S1 interface. The backhaul communication unit 240 is used for communication performed on the X2 interface, communication performed on the S1 interface, and the like.

(5) Architecture of Core Network Apparatus

Figure 5:
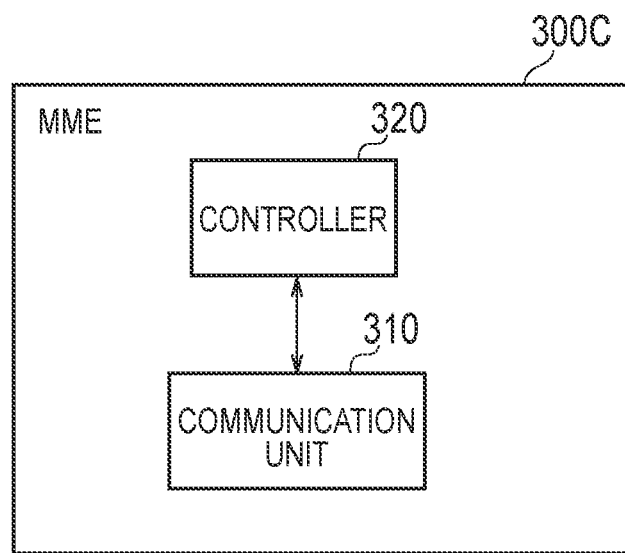
FIG. 5 is a block diagram of an MME (core network apparatus).

FIG. 5 is a block diagram of an MME 300C (core network apparatus). As illustrated in FIG. 5, the MME 300C includes a communication unit 310 and a controller 320.

The communication unit 310 is connected to the eNB 200 via an S1 interface and is connected to the S-GW 300U via an S5 interface. The communication unit 310 is used for communication performed on the S1 interface, communication performed on the S5 interface, and the like.

The controller 320 performs a variety of control on the MME 300C. The controller 320 includes a processor and a memory. The memory stores a program executed by the processor, and information used for processing by the processor. The processor includes a CPU configured to execute a program stored in the memory and performs a variety of processes. The processor performs the various communication protocols described above and various processes to be described later.

[Overview of Idle Mode DRX]

An idle mode discontinuous reception (DRX) will be described below.

The UE 100 in an RRC idle mode can perform a DRX operation so as to reduce power consumption. The UE 100 performing the DRX operation intermittently monitors a PDCCH. Generally, the PDCCH in a subframe carries scheduling information (radio resource and transport format information) of the PDSCH in the subframe. Since it is possible to turn off the receiving set of the UE 100 in a period (sleep period) in which the PDCCH is not monitored, the power consumption of the UE 100 is reduced.

In the DRX operation of the RRC idle mode, the UE 100 intermittently monitors the PDCCH so as to receive a paging mainly for notifying an incoming call. The UE 100 decodes the PDCCH by using a group identifier (P-RNTI) for the paging and acquires paging channel allocation information. The UE 100 acquires a paging message based on the allocation information. A PDCCH monitoring timing in the UE 100 is determined based on an identifier (IMSI: international mobile subscriber identity) of the UE 100. The calculation of the PDCCH monitoring timing will be specifically described.

The PDCCH monitoring timing (PDCCH monitoring subframe) in the DRX operation of the RRC idle mode is referred to as paging occasion (PO). The PO corresponds to a paging reception opportunity.

The UE 100 and the eNB 200 calculate paging occasion (PO) and a paging frame (PF) that is a radio frame including paging occasion (PO) as follows.

A system frame number (SFN) of PF is obtained from the following Formula (1).

$$\text{SFN mod } T = (T \text{ div } N)^*(\text{UE\_ID mod } N) \qquad (1)$$

It is noted that T is the DRX cycle of the UE 100 for monitoring paging and is expressed by the number of radio frames. In addition, T is the smaller one of a default DRX value the eNB 200 broadcasts by a system information block (SIB) and a UE-specific DRX value configured to the UE 100 by the NAS message. If the UE-specific DRX value is not configured, the UE 100 applies the default DRX value. In addition, N is the minimum value of T and nB. nB is a value selected from among 4T, 2T, T, T/2, T/4, T/8, T/16, and T/32. UE_ID is a value obtained from "IMSI mod1024".

Among the PFs obtained in the above manner, the subframe number of PO is obtained as follows. First, an index i_s is obtained by the following Formula (2).

$$i\_s = \text{floor}(UE\_ID/N) \bmod Ns \qquad (2)$$

Ns is the maximum value from among 1 and nB/T.

Next, PO corresponding to Ns and the index i_s is obtained from Table 1 or Table 2. Table 1 is applied to an LTE FDD system, and Table 2 is applied to an LTE TDD system. In Table 1 and Table 2, N/A represents non-application.

TABLE 1

| Ns | PO when i_s = 0 | PO when i_s = 1 | PO when i_s = 2 | PO when i_s = 3 |
|---|---|---|---|---|
| 1 | 9 | N/A | N/A | N/A |
| 2 | 4 | 9 | N/A | N/A |
| 4 | 0 | 4 | 5 | 9 |

TABLE 2

| Ns | PO when i_s = 0 | PO when i_s = 1 | PO when i_s = 2 | PO when i_s = 3 |
|---|---|---|---|---|
| 1 | 0 | N/A | N/A | N/A |
| 2 | 0 | 5 | N/A | N/A |
| 4 | 0 | 1 | 5 | 6 |

In the PO (paging reception opportunity) of the PF calculated in this way, the UE 100 monitors the paging (specifically, PDCCH). If it is necessary to transmit the paging to the UE 100, the eNB 200 transmits the paging addressed to the UE 100 at the PO (paging reception opportunity) of the PF.

[Overview of Idle Mode Extended DRX]

The idle mode extended DRX (eDRX: extended discontinuous reception) will be described below.

The UE 100 in the RRC idle mode can perform an eDRX operation so as to further reduce power consumption. The DRX cycle longer than the DRX cycle of the normal DRX (non-extended DRX) operation is used for the eDRX operation. The long DRX cycle is referred to as an eDRX cycle. It is noted that the eDRX cycle may be explicitly defined as an eDRX cycle, or may be implicitly defined as a DRX cycle having a predetermined length or more.

The eDRX cycle has a time length of, for example, 10.24 [s] or more. The UE 100 is in a sleep state during the eDRX cycle and monitors the paging after exiting from the sleep state (that is, after waking up).

In the sleep state of the eDRX, the UE 100 is exempt from receiving the paging message at the paging reception opportunity. In addition, since the eNB 200 or the MME 300 can recognize that the UE 100 does not receive the paging message in the sleep state of the eDRX, the eNB 200 or the MME 300 does not transmit the paging message to the UE 100. A period other than the eDRX cycle may be referred to as a wake-up period. In other words, a state other than the sleep state of the eDRX may be referred to as a wake-up state. In the wake-up state of the eDRX, the UE 100 monitors the paging message at the paging reception opportunity determined by the PF and the PO described above.

As a method of specifying the eDRX cycle, two methods are studied. One is a method of introducing an extended bit (H-SFN) to the system frame number (SFN). Since the DRX cycle is represented by the number of radio frames, it is possible to correspond to the eDRX cycle by extending the SFN. The other is a method of introducing a timer (eDRX timer) that defines the eDRX cycle. The UE 100 exits (wakes up) the sleep state of the eDRX upon expiration of the eDRX timer.

In an embodiment, it is mainly assumed that the MME 300C (core network apparatus) configures the eDRX to the UE 100. Specifically, the MME 300C notifies the UE 100 of the configuration parameters of the eDRX according to the NAS message. The configuration parameters of the eDRX are, for example, the timer value of the eDRX timer, the number of subframes (interval) of the eDRX cycle, and the like.

After leaving the sleep state of the DRX, the UE 100 monitors the paging at the paging reception opportunity determined by the calculation formula of the PF and the PO described above. In other words, the parameters in the normal DRX are used for the calculation of the PF and the PO. The parameters in the normal DRX are, for example, the default DRX value the eNB 200 broadcasts by the SIB, the UE-specific DRX value configured to the UE 100 by the NAS message, and the like.

In order to improve the reliability of the paging reception, the eNB 200 can repeatedly transmit the paging message to the UE 100, to which the eDRX is configured, at a plurality of paging reception opportunities within a certain period. The period may be referred to as a paging transmission window (PTW).

Figure 6:
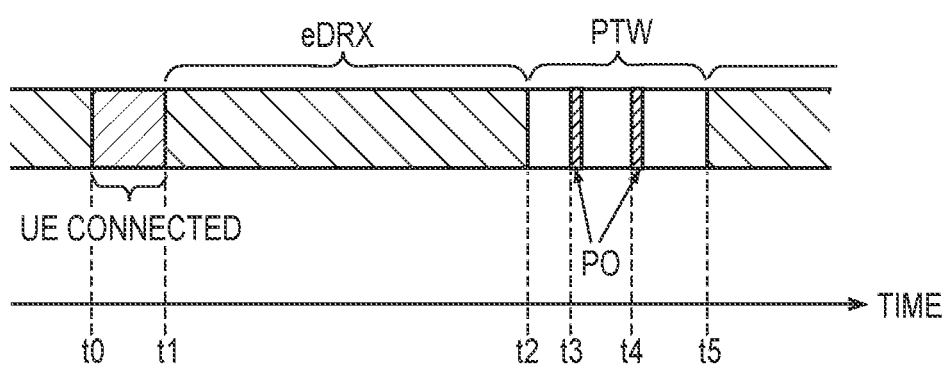
FIG. 6 is a diagram for describing an operation example of an eNB and a UE related to eDRX.

FIG. 6 is a diagram for describing an operation example of the eNB 200 and the UE 100 related to the eDRX.

As illustrated in FIG. 6, the UE 100 is in the RRC connected state during a period from time t0 to t1. The MME 300C may configure the eDRX to the UE 100 within this period.

During the period from time t1 to time t2, the UE 100 is in the sleep state of the eDRX. The period from time t1 to time t2 corresponds to the eDRX cycle. The operation for the UE 100 to start the eDRX will be described in the first embodiment.

At time t2, the UE 100 exits (wakes up) the sleep state of the eDRX. The period from time t2 to time t5 corresponds to the paging transmission window (PTW). Based on the paging message from the MME 300C, the eNB 200 repeatedly transmits the paging at the paging reception opportunity (PF and PO) within the paging transmission window. However, the UE 100 does not have to grasp the paging transmission window. An operation related to the paging message between the MME 300C and the eNB 200 will be described in a second embodiment. An operation of determining the paging reception opportunity to the UE 100 will be described in a third embodiment.

At time t3 and time t4, the paging reception opportunity (PF and PO) of the UE 100 occurs. The eNB 200 repeatedly transmits the paging to the UE 100 at time t3 and time t4. An operation in which the eNB 200 repeatedly transmits the paging and an operation in which the UE 100 monitors the paging will be described in a fourth embodiment.

At time t5, the UE 100 transitions from the wake-up state of the eDRX to the sleep state.

Here, it is assumed that the eNB 200 has the capability of eDRX. An operation of the UE 100 in consideration of the existence of the eNB 200 not having the capability of eDRX will be described in a fifth embodiment.

First Embodiment

The first embodiment will be described below. The first embodiment is an embodiment relating to the operation for the UE 100 to start the eDRX.

The UE 100 according to the first embodiment transmits information for releasing the connection between the UE 100 and the eNB 200 to the eNB 200 in the connected mode after the idle mode eDRX is configured from the MME 300C to the UE 100. If the UE 100 confirms that no communication data of the UE 100 exists in the connected mode, the UE 100 may transmit, to the eNB 200, the information for releasing the connection between the UE 100 and the eNB 200.

Alternatively, after the MME 300C configures the idle mode eDRX to the UE 100, the MME 300C transmits, to the eNB 200, the information for releasing the connection between the UE 100 and the eNB 200 in the connected mode. If the MME 300C confirms that no communication data of the UE 100 exists in the connected mode, the MME 300C may transmit, to the eNB 200, the information for releasing the connection between the UE 100 and the eNB 200.

In the first embodiment, after the idle mode eDRX is configured from the MME 300C to the UE 100, the UE 100 starts the eDRX if the connection between the UE 100 and the eNB 200 is released. After the timer value of the DRX cycle of the eDRX is configured from the MME 300C, the UE 100 may start the eDRX in the idle mode if the timer corresponding to the timer value is running when releasing the connection.

Therefore, according to the first embodiment, if the idle mode eDRX is configured from the MME 300C to the UE 100, the UE 100 can transition to the idle mode as soon as possible. Therefore, the UE 100 can start the idle mode eDRX as soon as possible.

Figure 7:
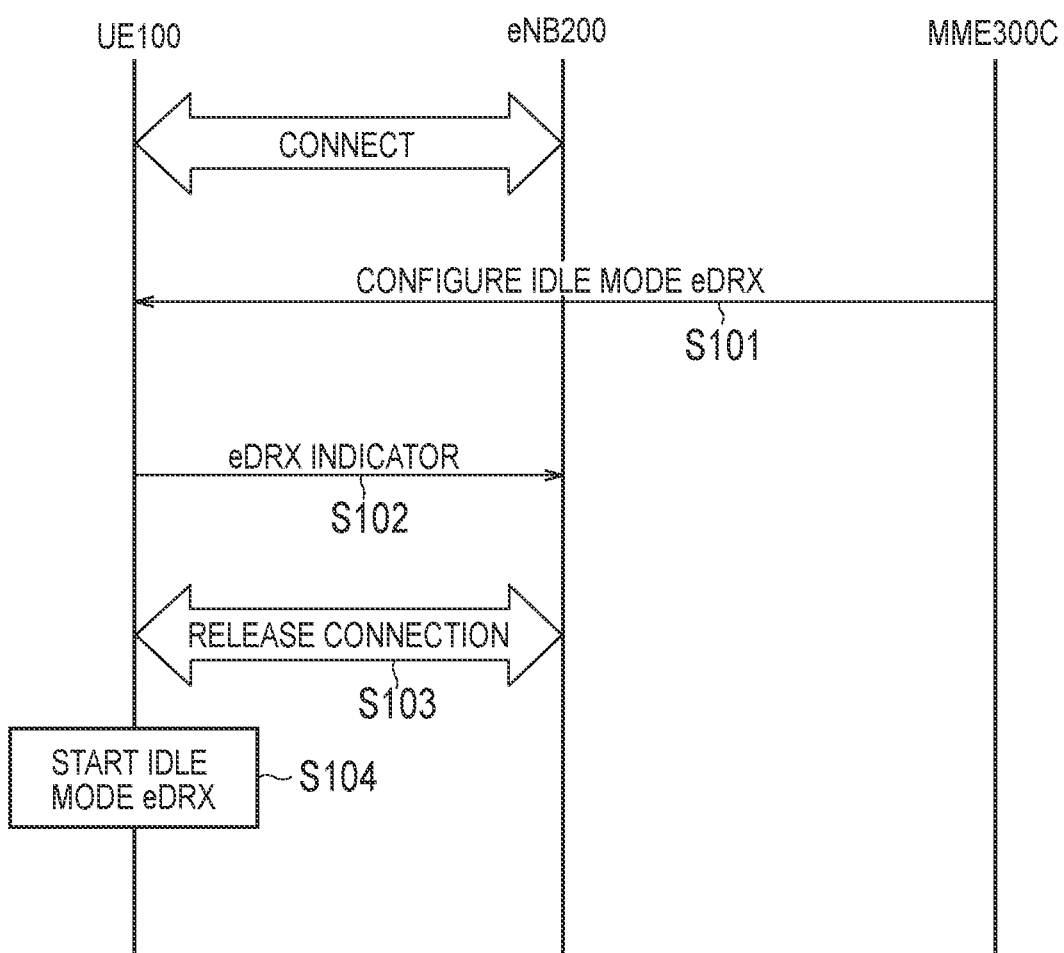
FIG. 7 is a diagram illustrating an example of an operation pattern 1 according to a first embodiment.

FIG. 7 is a diagram illustrating an example of an operation pattern 1 according to the first embodiment. In the initial state of FIG. 7, the UE 100 is in the connected mode (RRC connected mode) in the cell of the eNB 200.

As illustrated in FIG. 7, in step S101, the MME 300C configures the idle mode eDRX to the UE 100 by transmitting the configuration parameter of the idle mode eDRX to the UE 100. The configuration parameter of the eDRX may include the timer value of the eDRX timer. The UE 100 receives and stores (configures) the configuration parameters of the eDRX.

In step S102, the UE 100 transmits, to the eNB 200, information (eDRX indicator) for releasing the connection between the UE 100 and the eNB 200. The eNB 200 receives the eDRX indicator. The eDRX indicator may be notification information indicating that the eDRX is configured to the UE 100. The eDRX indicator may be request information requesting the release of the connection (RRC connection).

The UE 100 may check an uplink buffer of the UE 100 and may transmit the eDRX indicator to the eNB 200 when there is no uplink data. Alternatively, the AS entity of the UE 100 may acquire information about the presence or absence of uplink and downlink data from the application layer and may transmit the eDRX indicator to the eNB 200 when there is no uplink and downlink data.

In step S103, the eNB 200 releases the connection (RRC connection) with the UE 100 in response to the reception of the eDRX indicator. The eNB 200 may confirm a downlink buffer of the eNB 200 and may release the RRC connection when there is no downlink data to the UE 100. Based on a buffer status report (BSR) from the UE 100, the eNB 200 may release the RRC connection when there is no uplink data of the UE 100.

In step S104, the UE 100 starts the idle mode eDRX in response to the release of the RRC connection. Specifically, the UE 100 transitions to the sleep state in the idle mode eDRX.

Figure 8:
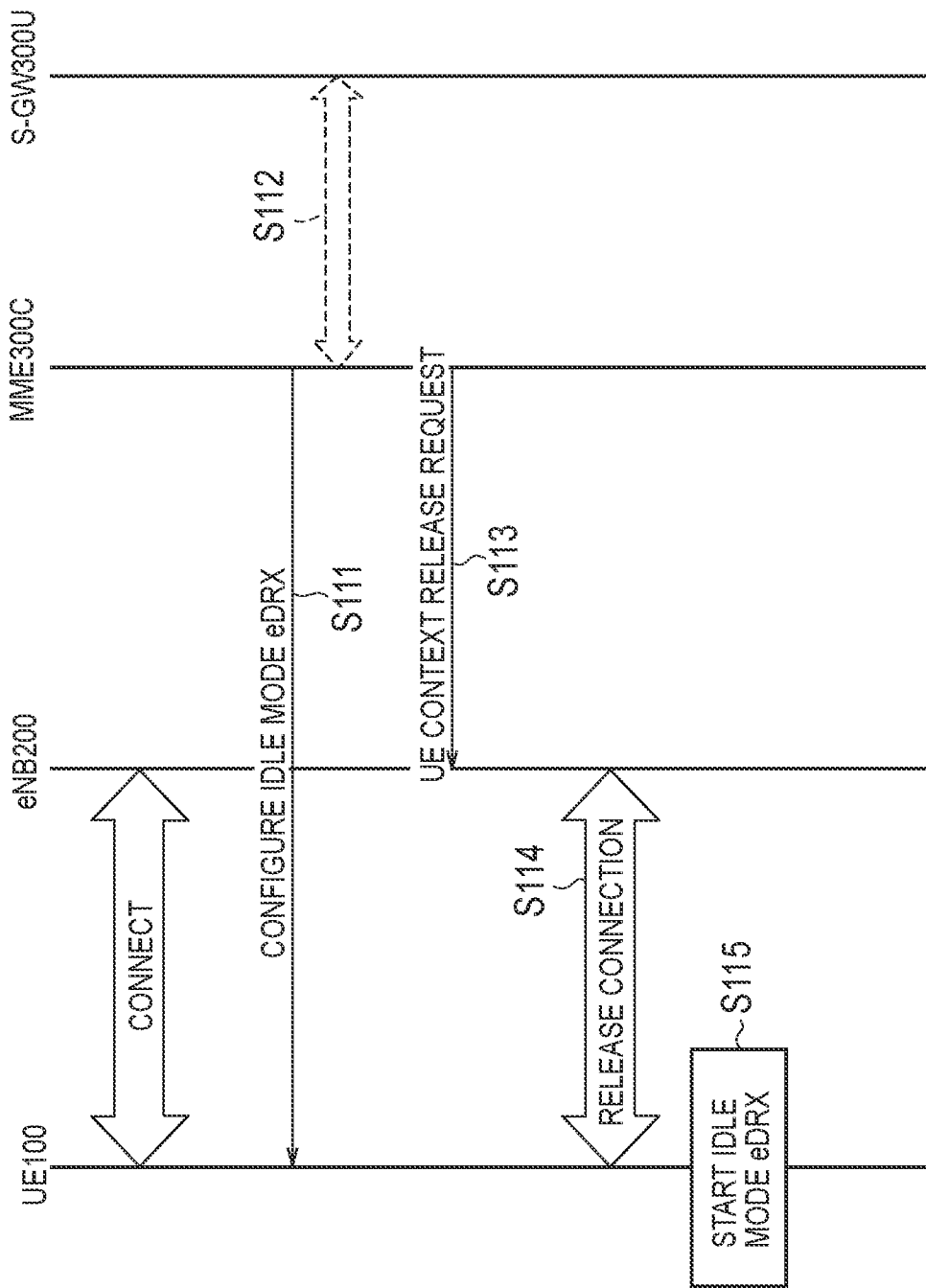
FIG. 8 is a diagram illustrating an example of an operation pattern 2 according to the first embodiment.

FIG. 8 is a diagram illustrating an example of an operation pattern 2 according to the first embodiment. In the initial state of FIG. 8, the UE 100 is in the connected mode (RRC connected mode) in the cell of the eNB 200.

As illustrated in FIG. 8, in step S111, the MME 300C configures the idle mode eDRX to the UE 100 by transmitting the configuration parameter of the idle mode eDRX to the UE 100. The configuration parameter of the eDRX may include the timer value of the eDRX timer. The UE 100 receives and stores (configures) the configuration parameters of the eDRX.

In step S112, the MME 300C may inquire the S-GW 300U about the presence or absence of communication data (uplink data and downlink data) of the UE 100. Alternatively, the MME 300C may inquire the NAS entity of the UE 100 about the presence or absence of communication data of the UE 100. If the MME 300C confirms that the communication data of the UE 100 is absent, the MME 300C may shift the process to step S113.

In step S113, the MME 300C transmits, to the eNB 200, a UE context release request for releasing the connection between the UE 100 and the eNB 200. The eNB 200 receives the UE context release request. Instead of the UE context release request, the MME 300C may transmit, to the eNB 200, notification information indicating that the eDRX has been configured to the UE 100.

In step S114, the eNB 200 releases the connection (RRC connection) with the UE 100 in response to the reception of the UE context release request (or notification information). The eNB 200 may confirm the downlink buffer of the eNB 200 and may release the RRC connection when there is no downlink data to the UE 100. Based on the buffer status report (BSR) from the UE 100, the eNB 200 may release the RRC connection when there is no uplink data of the UE 100.

In step S115, the UE 100 starts the idle mode eDRX in response to the release of the RRC connection. Specifically, the UE 100 transitions to the sleep state in the idle mode eDRX.

Figure 9:
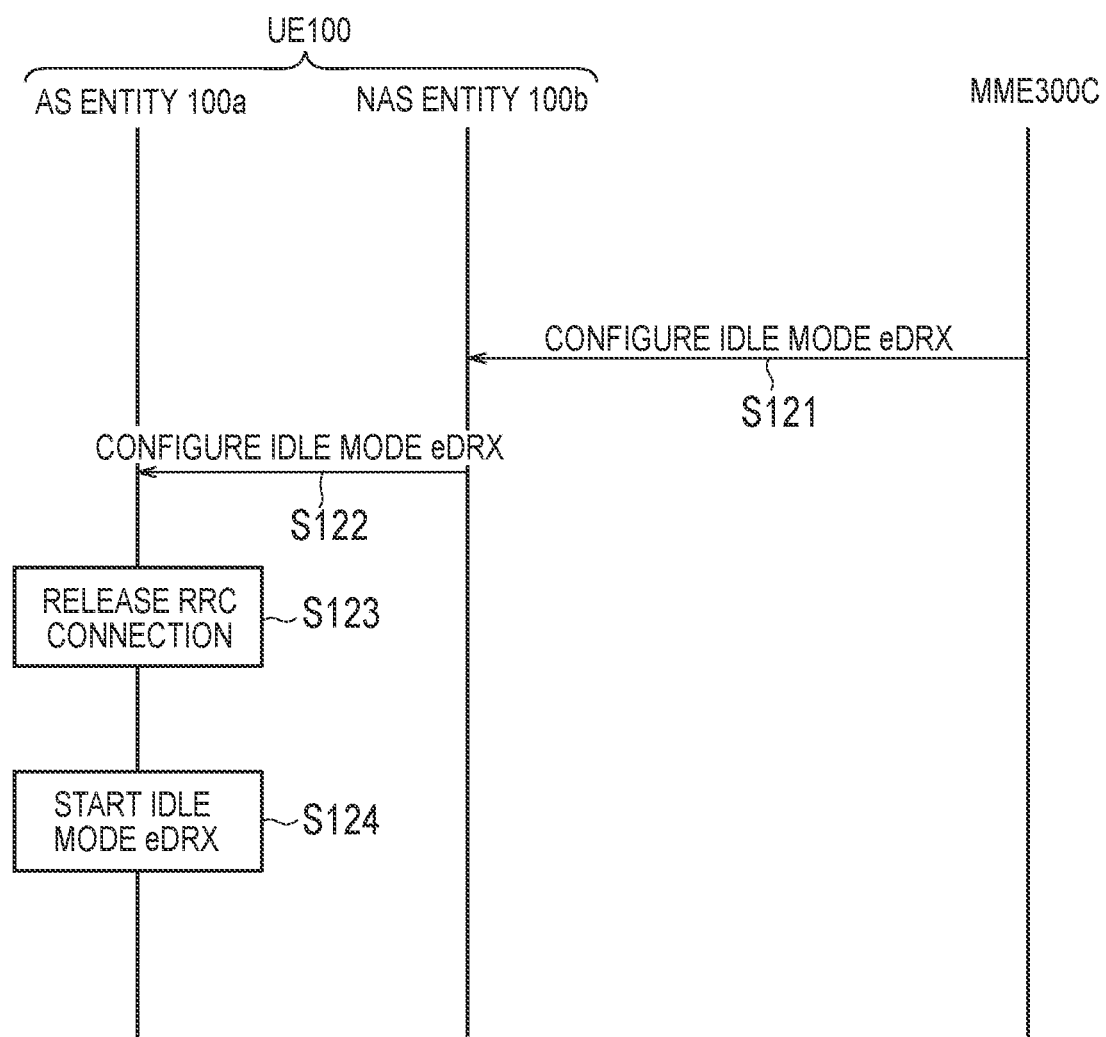
FIG. 9 is a diagram illustrating an example of an operation of a UE according to the first embodiment.

FIG. 9 is a diagram illustrating an example of the operation of the UE 100 according to the first embodiment.

As illustrated in FIG. 9, in step S121, the NAS entity 100*b* of the UE 100 receives configuration parameter of eDRX from the MME 300C. The configuration parameter of the eDRX may include a timer value of an eDRX cycle (eDRX timer value).

In step S122, the NAS entity 100*b* of the UE 100 notifies the AS entity 100*a* of the configuration parameter of the eDRX.

In step S123, the AS entity 100*a* of the UE 100 releases an RRC connection. The AS entity 100*a* of the UE 100 may release the RRC connection according to an instruction from the eNB 200.

In step S124, the AS entity 100*a* of the UE 100 starts the eDRX based on the configuration parameter of the eDRX. If the configuration parameter of the eDRX includes the eDRX timer value, the AS entity 100*a* may start the idle mode eDRX if the timer corresponding to the timer value is running.

Second Embodiment

In the second embodiment, differences from the first embodiment will be described below. The second embodiment is an embodiment relating to an operation of a paging message (S1 paging) between the MME 300C and the eNB 200.

The eNB 200 according to the second embodiment receives, from the MME 300C, a paging message used for paging of the UE 100. The paging message includes information about the idle mode eDRX.

In an operation pattern 1 of the second embodiment, the paging message includes information for the eNB 200 to determine whether the idle mode eDRX is configured to the UE 100 as information about the idle mode eDRX.

In an operation pattern 1-1 of the second embodiment, the paging message includes a first field for non-eDRX (normal idle mode DRX) and a second field for idle mode eDRX. For example, the first field is a "paging DRX IE" field. The second field is an "extended paging DRX IE" field. That is, a new "extended paging DRX IE" field is added to the paging message while maintaining the existing "paging DRX IE" field. If information (extended paging DRX IE) indicating the DRX cycle of the eDRX is included in the second field, the eNB 200 determines that the eDRX is configured to the UE 100.

In an operation pattern 1-2 of the second embodiment, the paging message includes information (paging DRX IE) indicating the DRX cycle configured to the UE 100. In this case, the new "extended paging DRX IE" field is not added to the paging message, and the range of the existing "paging DRX IE" is expanded. If the DRX cycle indicated by the corresponding information is equal to or longer than a specified time, the eNB 200 determines that the eDRX is configured to the UE 100. A case in which the DRX cycle is equal to or longer than the specified time may be a case in which the value of "paging DRX IE" is a value equal to or greater than a threshold value (for example, 256).

According to the operation pattern 1 of the second embodiment, the eNB 200 can grasp whether the idle mode eDRX is configured to the UE 100, based on the paging message. As a result, the eNB 200 can perform the eDRX paging process (see, for example, the operation pattern 2 of the second embodiment) to the UE 100 in which the idle mode eDRX is configured.

In the operation pattern 2 of the second embodiment, the paging message includes information for the eNB 200 to determine the paging transmission timing for the UE 100 as information about the idle mode eDRX.

In the operation pattern 2-1 of the second embodiment, the paging message includes time information indicating the reference time for performing the paging. In this pattern, it is assumed that the eDRX cycle is specified by the eDRX timer described above. For example, the reference time for performing the paging is expressed in absolute time. Absolute time is coordinated universal time (UTC) or the like. The eNB 200 performs the paging based on the time information. Specifically, the eNB 200 specifies the paging transmission window (PTW) including the absolute time, and performs repeated transmission (repetition) of the paging at the paging reception opportunity (PF and PO) of the PTW. The eNB 200 may use the reference time (absolute time) as the start point of the PTW or as the end point of the PTW. Alternatively, the eNB 200 may use the reference time (absolute time) as the timing when the UE 100 enters the sleep state of the eDRX or the timing when the UE 100 wakes up from the sleep state of the eDRX.

In an operation pattern 2-2 of the second embodiment, the paging message includes retransmission control information indicating the number of repeated transmissions of paging. For example, the MME 300C determines the number of repeated transmissions of paging in consideration of delay and variation (jitter) of the S1 interface with the eNB 200, and notifies the eNB 200 of the number of repeated transmission of paging. The eNB 200 repeatedly transmits the paging based on the retransmission control information. Specifically, after receiving the paging message, the eNB 200 performs paging transmission the number of times specified in the paging reception opportunity (PF and PO).

According to the operation pattern 2 of the second embodiment, even if the idle mode eDRX is configured to the UE 100, the reliability of the paging can be guaranteed.

It is noted that the MME 300C may notify the UE 100 of the number of repeated transmissions of the paging. For example, when the idle mode eDRX is configured to the UE 100, the MME 300C notifies the UE 100 of the number of repeated transmissions of the paging. The UE 100 can determine an appropriate wake-up timing while referring to the notified number of repeated transmissions. For example, when the number of repeated transmissions is small, the UE 100 advances a wake-up timing.

Figure 10:
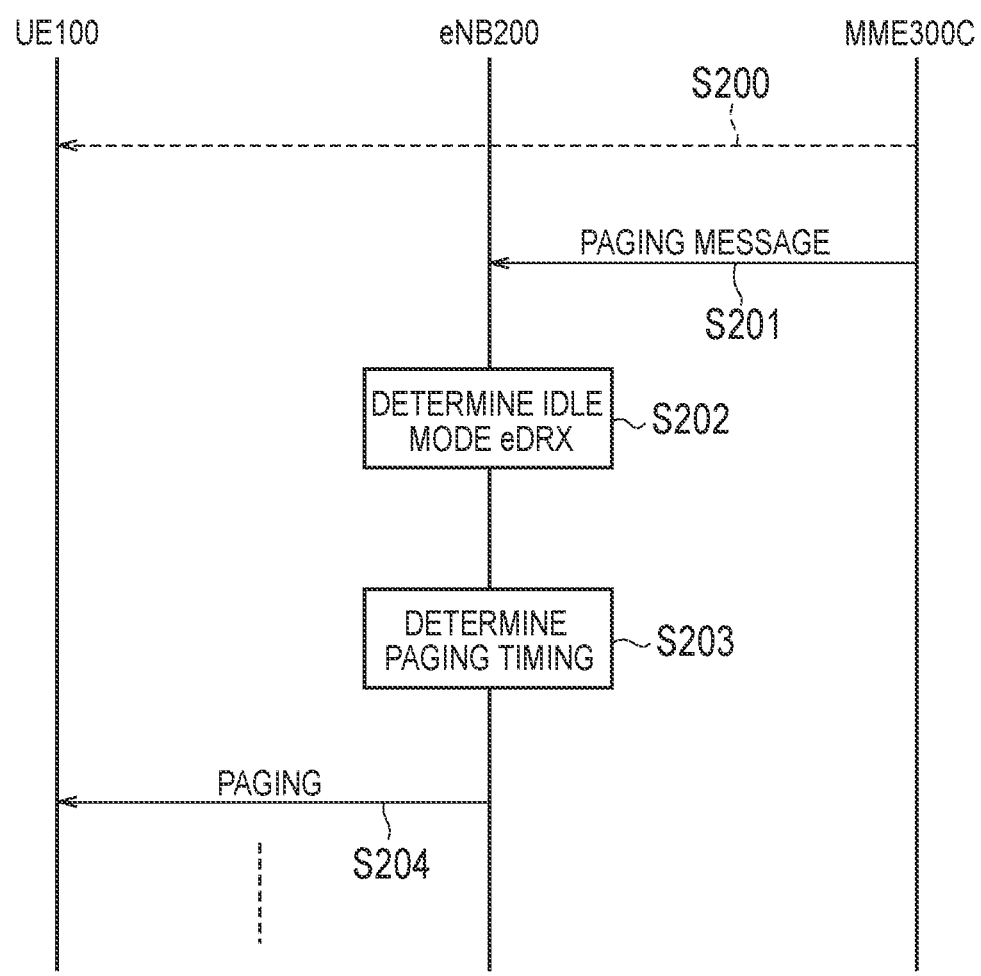
FIG. 10 is a diagram illustrating an example of an operation according to a second embodiment.

FIG. 10 is a diagram illustrating an example of an operation according to the second embodiment. Prior to this operation, the eNB 200 may notify the UE 100 of the number of repeated transmissions of the paging (step S200).

As illustrated in FIG. 10, in step S201, the MME 300C transmits a paging message (S1 paging) to the eNB 200. The paging message includes information for the eNB 200 to determine whether the idle mode eDRX is configured to the UE 100 (operation pattern 1). The paging message includes information for the eNB 200 to determine the paging transmission timing for the UE 100 (operation pattern 2). The eNB 200 receives the paging message.

In step S202, the eNB 200 determines whether the idle mode eDRX is configured to the UE 100 to be paged, based on the information included in the paging message (operation pattern 1). Here, it is assumed that the idle mode eDRX is configured to the UE 100 to be paged, and the description will be advanced.

In step S203, the eNB 200 determines the paging transmission timing (for example, the PTW, the number of repeated transmissions of the paging) for the UE 100 to be paged, based on the information included in the paging message (operation pattern 2).

In step S204, the eNB 200 performs paging transmission (repeated transmission) to the UE 100 based on the determination result of step S203.

Modification of Second Embodiment

Figure 11:
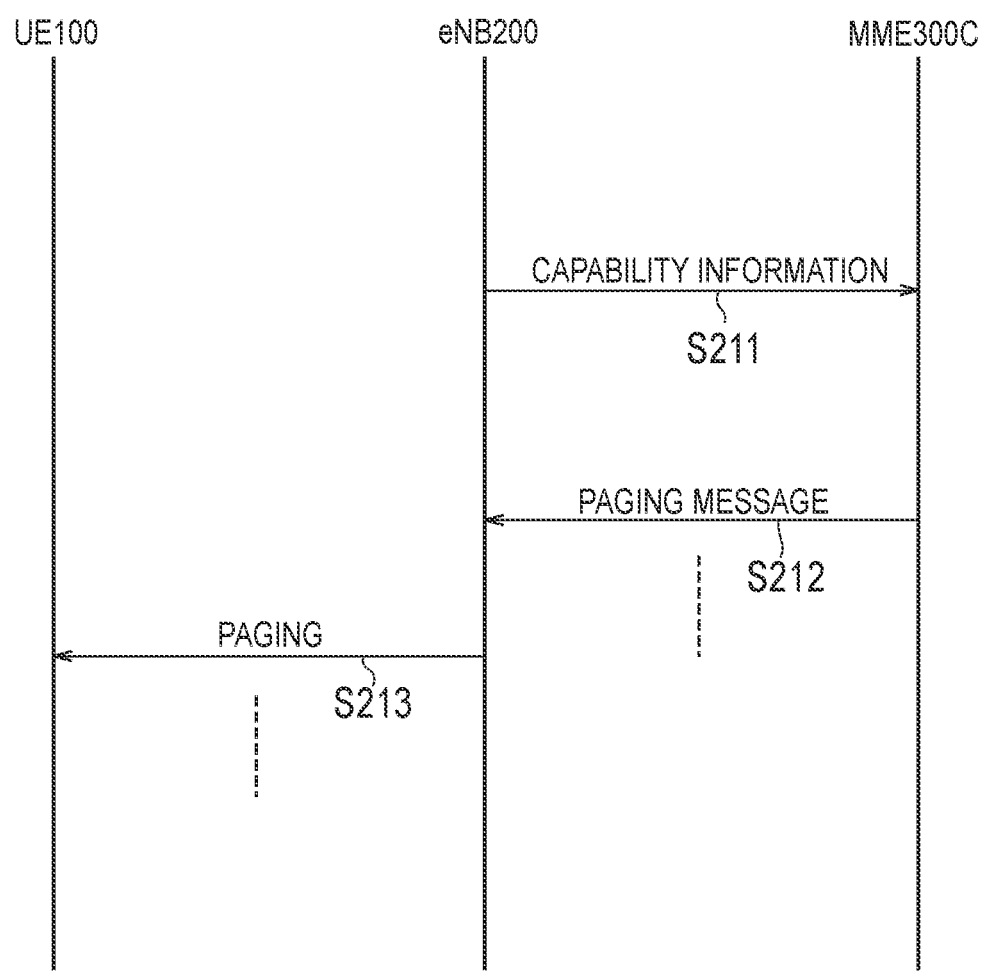
FIG. 11 is a diagram illustrating a modification of the second embodiment.

FIG. 11 is a diagram illustrating a modification of the second embodiment.

As illustrated in FIG. 11, the eNB 200 transmits, to the MME 300C, information (capability information) indicating whether the eNB 200 has the capability of repeatedly transmitting the paging. The eNB 200 may include capability information in a message for establishing the S1 interface (S1 setup request), or may include capability information in a message for updating the configuration of the eNB 200 (S1 eNB configuration update). The capability information may be information indicating that the eNB 200 is an eNB corresponding to the eDRX. The capability information may be a release number of a standard to which the eNB 200 conforms.

Based on the capability information received from the eNB 200, the MME 300C grasps whether the eNB 200 has the capability of repeatedly transmitting the paging. Here, the description will be made on the assumption that the eNB 200 does not have the capability of repeatedly transmitting the paging.

In step S212, the MME 300C repeatedly transmits the paging message to the eNB 200. The eNB 200 receives the repeatedly transmitted paging message.

In step S213, the eNB 200 repeatedly transmits, to the UE 100, a plurality of paging corresponding to the plurality of paging messages received from the MME 300C.

According to the modification of the second embodiment, even if the eNB 200 does not have the capability of autonomously repeatedly transmitting the paging, it is possible to cause the eNB 200 to perform the repeated transmission of the paging, thereby improving the reliability of the paging.

Third Embodiment

In the third embodiment, differences from the first embodiment and the second embodiment will be described below. The third embodiment is an embodiment relating to an operation of determining a paging reception opportunity of the UE 100.

In an idle mode (RRC idle mode), the UE 100 according to the third embodiment determines the paging reception opportunity (PF and PO) of the UE 100 based on the first parameter provided from the MME 300C or the second parameter provided from the eNB 200. For example, the first parameter is a UE-specific DRX value configured to the UE 100 by the NAS message. The second parameter is a default DRX value that the eNB 200 broadcasts by the SIB. As described above, in the normal idle mode DRX, the UE 100 determines the paging reception opportunity (PF and PO) by using whichever smaller one of the UE-specific DRX value and the default DRX value. Similarly, the eNB 200 calculates the paging reception opportunity (PF and PO) and determines the paging transmission timing.

However, the eNB 200 repeatedly transmits the paging to the UE 100 in which the idle mode eDRX is configured. In this case, it can be considered that the second parameter provided by the eNB 200 can more appropriately determine the paging reception opportunity (PF and PO) than the first parameter provided by the MME 300C.

Therefore, if the idle mode eDRX is configured to the UE 100 according to the third embodiment, the UE 100 ignores the first parameter and determines the paging reception opportunity based on the second parameter. Similarly, if the idle mode eDRX is configured to the UE 100, the eNB 200 ignores the first parameter and determines the paging transmission timing based on the second parameter. Specifically, if the idle mode eDRX is configured to the UE 100, the UE 100 and the eNB 200 calculate the paging reception opportunity (PF and PO) using the second parameter even if the first parameter (UE-specific DRX value) is configured to the UE 100 and the first parameter is less than the second parameter.

It is noted that the second parameter provided from the eNB 200 is not limited to the default DRX value, but may be a new DRX value. The new DRX value is, for example, a value unique to RAN (that is, a value not related to the core network). Alternatively, the new DRX value may be an eNB-specific (cell-specific) value.

The new DRX value may be provided by the eNB 200 in the SIB, or may be provided by dedicated signaling addressed to the UE 100. The dedicated signaling may be an RRC connection release message. It is noted that the new DRX value is preferably 32 SFN (calculated value of nB) or more. Specifically, as described above, "nB=(paging cycle)/32" is calculated and nB is the DRX cycle for calculating PF/PO. Thus, If the current calculation formula (value definition) is diverted as it is, only 32 SFN or more can be taken.

According to the third embodiment, even if the eNB 200 repeatedly transmits the paging, it is possible to appropriately determine the paging reception opportunity (PF and PO).

Fourth Embodiment

In the fourth embodiment, differences from the first to third embodiments will be described below. The fourth embodiment is an embodiment relating to the operation in which the eNB 200 repeatedly transmits the paging and the operation in which the UE 100 monitors the paging.

If the idle mode eDRX is configured to the UE 100, the eNB 200 according to the fourth embodiment repeatedly transmits the paging at two or more paging reception opportunities (PF and PO) of the UE 100. The two or more paging reception opportunities include a specific paging reception opportunity corresponding to a wake-up timing in the eDRX of the UE 100 and a next paging reception opportunity of the specific paging reception opportunity. However, the specific paging reception opportunity may be a timing when the eDRX timer simply expires, regardless of PF/PO.

The two or more paging reception opportunities may further include a previous paging reception opportunity of the specific paging reception opportunity. By performing such repeated transmission, a clock error (clock drift) of the UE 100 can be compensated.

Even if the eNB 200 repeatedly transmits the paging for each DRX cycle in the eDRX after the idle mode eDRX is configured to the UE 100, the UE 100 according to the fourth embodiment monitors the paging at one paging reception opportunity (PF and PO) for each DRX cycle. If the UE 100 does not receive the paging at the one paging reception opportunity, the UE 100 may transition to the sleep state in the eDRX. This makes it possible to more reliably achieve the purpose of the eDRX to reduce the power consumption of the UE 100.

Figure 12:
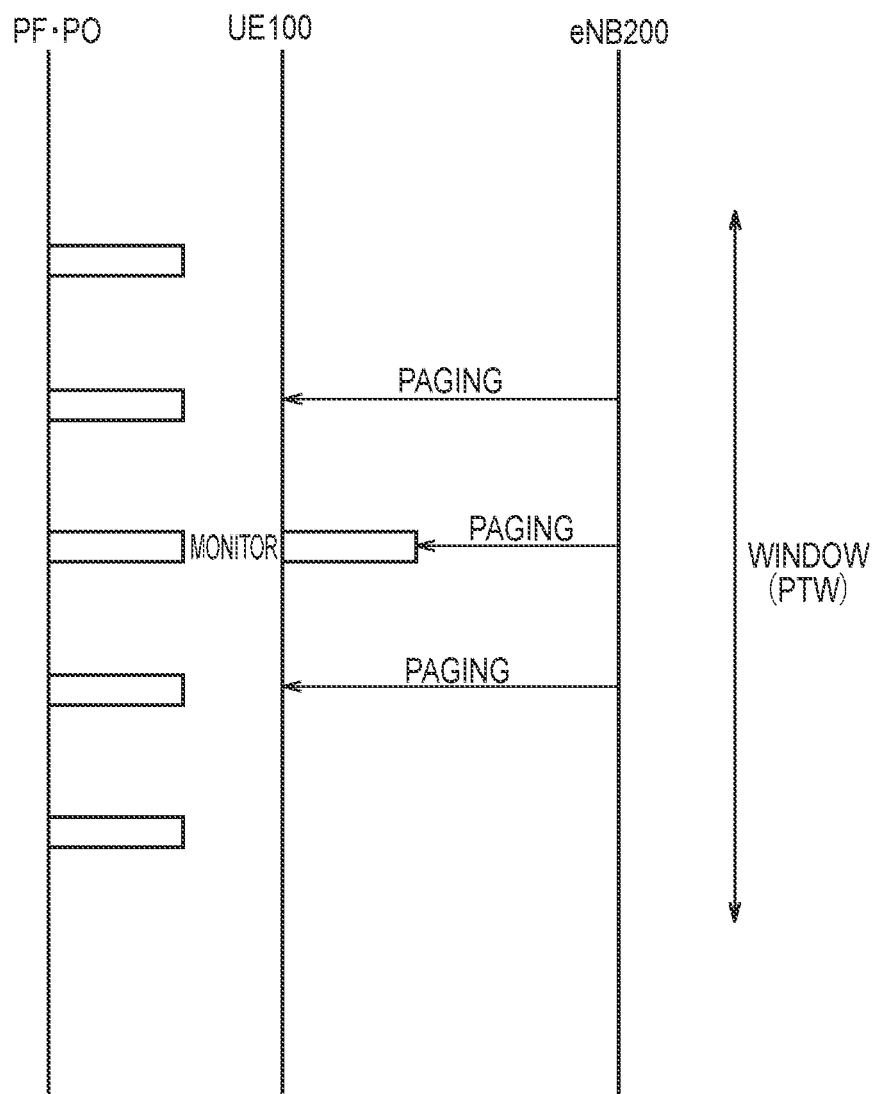
FIG. 12 is a diagram illustrating an example of an operation according to a fourth embodiment.
Figure 13:
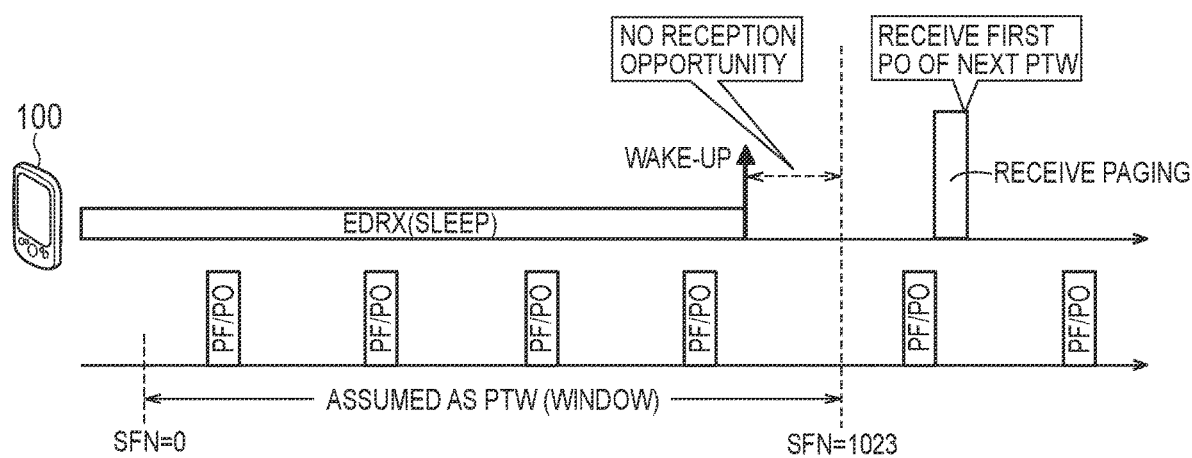
FIG. 13 is a diagram illustrating another example of an operation according to the fourth embodiment.

FIG. 12 is a diagram illustrating an example of an operation according to the fourth embodiment. FIG. 13 is a diagram illustrating another example of an operation according to the fourth embodiment.

As illustrated in FIG. 12, the UE 100 monitors the paging only at any one paging reception opportunity among a plurality of paging reception opportunities (PF and PO) in the paging transmission window (PTW). That is, even if the paging is repeatedly transmitted from the eNB 200, the UE 100 monitors the paging only at one paging reception opportunity. If the UE 100 does not receive the paging at the one paging reception opportunity, the UE 100 can enter the sleep state of the eDRX after the end of the one paging reception opportunity.

It is noted that the UE 100 may or may not grasp the paging transmission window. However, when it is mainly assumed that the UE 100 does not grasp the paging transmission window, as illustrated in FIG. 13, it is preferable that the paging transmission window coincides with 10.24 [s] (SFN upper limit value). In addition, the UE 100 considers the period until 10.24 [s] elapses from the wake-up (when the period of the eDRX cycle expires) as the paging transmission window, and monitors the paging at any one paging reception opportunity within 10.24 [s].

However, if the timing at which the UE 100 wakes up exceeds (or has not exceeded) a certain SFN, as illustrated in FIG. 13, the UE 100 must monitor the paging exceptionally again in the next paging transmission window (or 10.24 [s]). A "certain SFN" refers to a case in which the PF has never existed until SFN=1023 (maximum value). A "case in which the SFN exceeds a certain value" is, for example, 767 (=3/4), or 991 (=1023−rf32). "Monitoring the paging again" may be limited to the first paging reception opportunity (PF and PO) of the next paging transmission window (or 10.24 [s]).

Fifth Embodiment

In the fifth embodiment, differences from the first to fourth embodiments will be described below. The fifth embodiment is an embodiment relating to the operation of the UE 100 in consideration of the existence of the eNB 200 not having the capability of the eDRX.

If the UE 100 detects the eNB 200 that does not support the eDRX after the idle mode eDRX is configured to the UE 100, the UE 100 according to the fifth embodiment performs a process of stopping the eDRX. The process may include a process of transmitting, to the MME 300C, information for requesting the release of the eDRX. Therefore, even if the UE 100 exists in the cell of the eNB 200 that does not support the eDRX, it is possible to appropriately receive the paging.

Figure 14:
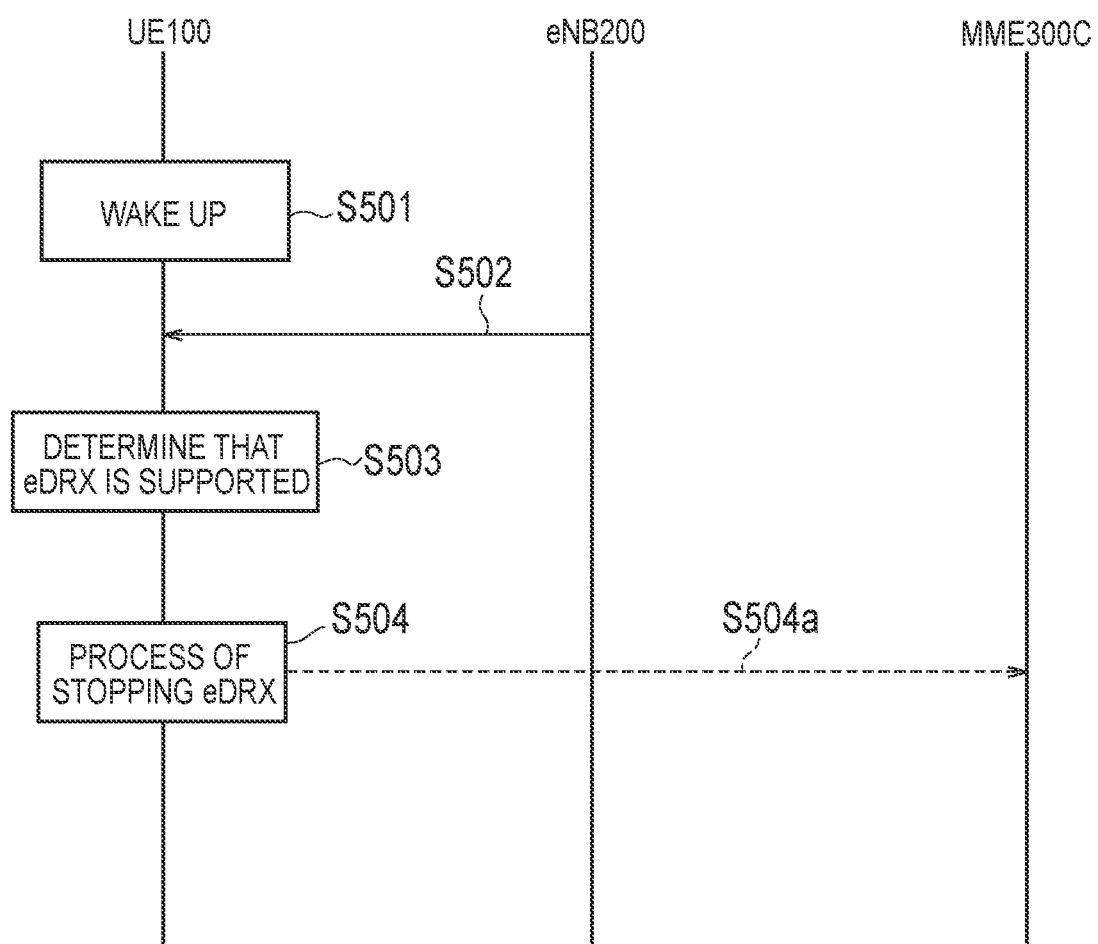
FIG. 14 is a diagram illustrating an example of an operation according to a fifth embodiment.

FIG. 14 is a diagram illustrating an example of an operation according to the fifth embodiment. In an initial state of FIG. 14, the UE 100 is in a sleep state of an eDRX.

As illustrated in FIG. 14, in step S501, the UE 100 exits the sleep state of the eDRX (wakes up). However, the UE 100 may also perform the following operations before transitioning to the sleep state of the eDRX.

In step S502, the UE 100 receives, from the eNB 200, information for determining whether the eNB 200 supports the eDRX. As a method of determining whether the eNB 200 supports the eDRX, there are the following methods.

As a first method, the eNB 200 transmits capability information indicating that the eNB 200 supports the eDRX by broadcast signaling (SIB or MIB). The eNB 200 may broadcast information indicating whether the eNB 200 performs paging repetition as capability information. If the capability information indicating that the eNB 200 supports the eDRX or performs paging repetition is received from the eNB 200, the UE 100 determines that the eNB 200 supports the eDRX (step S503). On the other hand, if the capability information indicating that the eNB 200 supports the eDRX is not received from the eNB 200, the UE 100 determines that the eNB 200 does not support the eDRX.

As a second method, the eNB 200 transmits the SIB including information for the eDRX (for example, H-SFN or the like). Alternatively, the eNB 200 may transmit the SIB including information about the release number of the standard to which the eNB 200 conforms. If the SIB including information for the eDRX (for example, H-SFN or the like) or the SIB including information about the release number corresponding to the eDRX is received from the eNB 200, the UE 100 determines that the eNB 200 supports the eDRX (step S503). If such information is not received from the eNB 200, it is determined that the eNB 200 does not support the eDRX.

The following description will be given on the assumption that the eNB 200 does not support the eDRX.

In step S504, the UE 100 performs a process for stopping the eDRX. The UE 100 may notify the MME 300C of the eDRX application cancellation (step S504*a*). In this case, it may be notified by a tracking area update (TAU) message.

In addition, while the UE 100 is in the cell, the normal DRX may be applied. In this case, the UE 100 may operate according to the default DRX value, regardless of the configuration of the NAS (see the third embodiment). The eNB 200 that does not support the eDRX cannot correctly interpret the paging message for eDRX from the MME 300C and is considered to perform the paging according to the default DRX value. Therefore, it is preferable that the UE 100 also monitors the paging according to the default DRX value.

Sixth Embodiment

In the sixth embodiment, differences from the first to fifth embodiments will be described below. The sixth embodiment is an embodiment relating to the idle mode eDRX of the H-SFN base. It is noted that the sixth embodiment can be implemented in combination with the first to fifth embodiments.

(1) Idle Mode eDRX of H-SFN Base

Figure 15:
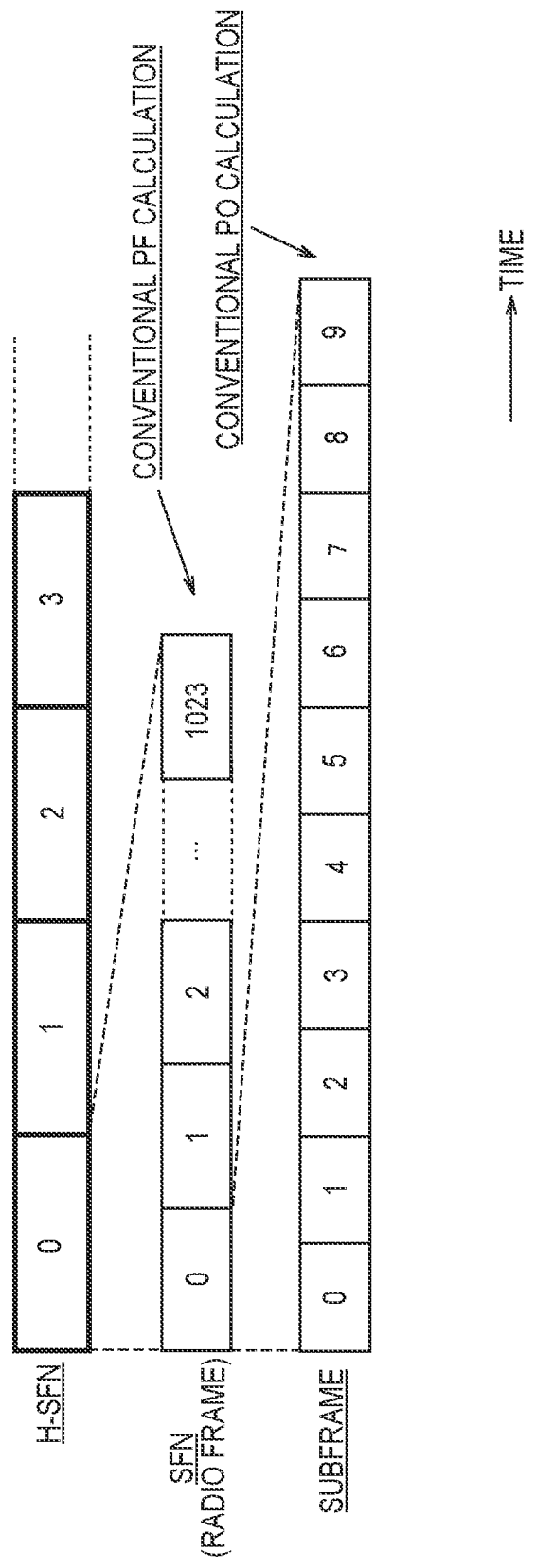
FIG. 15 is a diagram illustrating a relationship between a hyper-frame, a radio frame, and a subframe according to a sixth embodiment.

FIG. 15 is a diagram illustrating a relationship between a hyper-frame, a radio frame, and a subframe. The hyper-frame is identified by a hyper-frame number (H-SFN: hyper-system frame number). The radio frame is identified by a system frame number (SFN). The subframe is identified by a subframe number.

As illustrated in FIG. 15, one hyper-frame is constituted by 1024 radio frames. System frame numbers from 0 to 1023 are allocated to the 1024 radio frames.

In addition, one radio frame is constituted by ten subframes. Subframe numbers from 0 to 9 are allocated to the ten subframes.

It is noted that the upper limit number of the hyper-frame numbers is specified by the system specification. For example, 0 to 255 (that is, 256 hyper-frames) are defined as the hyper-frame numbers.

Figure 16:
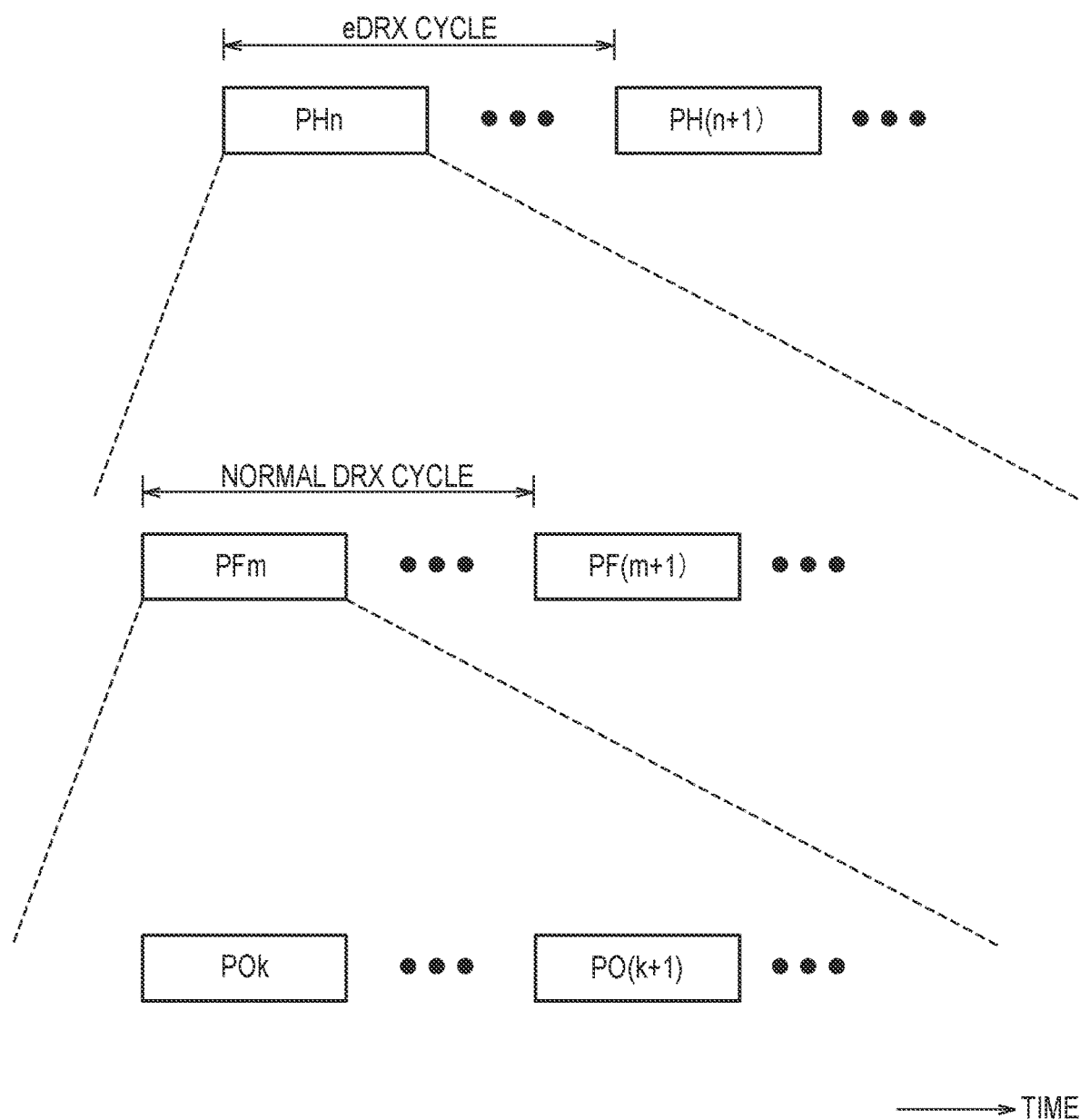
FIG. 16 is a diagram illustrating a relationship between a paging hyper-frame (PH), a paging frame (PF), and a paging occasion (PO) according to the sixth embodiment.

FIG. 16 is a diagram illustrating a relationship between a paging hyper-frame (PH), a paging frame (PF), and a paging occasion (PO).

As illustrated in FIG. 16, the UE 100 determines the paging hyper-frame (PH) that is a hyper-frame including a PF from among a plurality of hyper-frames. The PH is generated every eDRX cycle. The eDRX cycle has a time length that is an integral multiple of the hyper-frame (10.24 [s]). The UE 100 may be in a sleep state during a hyper-frame period other than the PH in the eDRX cycle. The operation of determining the PH will be described later.

In addition, the UE 100 determines, from the PH, the PF that is a radio frame including the PO of the UE 100. Specifically, the UE 100 determines the PF from the PH by using the existing PF calculation formula expressed by Formula (1) above. The PF is generated every normal DRX cycle indicated by "T" in Formula (1). The normal DRX cycle has a time length that is an integral multiple of the radio frame (10 [ms]). In the following, the existing PF calculation formula expressed by Formula (1) is referred to as "first calculation formula".

Further, the UE 100 determines a predetermined subframe as PO from the PF. Specifically, the UE 100 determines one or a plurality of PO candidate subframes from the PF by using the existing PO calculation formula expressed by Formula (2) above, and determines one of the PO candidate subframes as PO. The UE 100 monitors the paging only in one of the determined one or more POs. Hereinafter, the existing PO calculation formula expressed by Formula (2) is referred to as "second calculation formula". The number of POs included in one PF (that is, the paging capacity) can change according to the above-described nB.

(2) Operation According to Sixth Embodiment

Next, an operation according to a sixth embodiment will be described. The operation according to the sixth embodiment relates to an operation in which the UE 100 determines the PH. Although the operation of the UE 100 will be mainly described below, it should be noted that at least any one of the eNB 200 and the MME 300C determines the PH (and PF and PO) in the same manner as the UE 100. In the sixth embodiment, at least one of the eNB 200 and the MME 300C corresponds to a network apparatus.

The UE 100 according to the sixth embodiment determines the paging hyper-frame (PH) by using a third calculation formula defined separately of the first calculation formula used for PF determination and the second calculation formula used for PO determination.

As described above, the DRX parameter (hereinafter referred to as "broadcast DRX parameter") provided by the system information (SIB: system information block) from the eNB 200 is applied to the first calculation formula and the second calculation formula. The broadcast DRX parameter includes nB. The broadcast DRX parameter may include a default DRX value used for configuring a normal DRX cycle.

On the other hand, a predetermined parameter different from the broadcast DRX parameter is applied to the third calculation formula, without applying the broadcast DRX parameter. Specifically, nB (and default DRX value) is not applied to the third calculation formula. It is noted that nB is a parameter for controlling the paging capacity and is unnecessary in determining the PH. The predetermined parameter applied to the third calculation formula may include an eDRX cycle ("TeDRx" to be described later) provided from a core network apparatus (MME 300C).

If the hyper-frame number of the PH is indicated by "H-SFN", the number of hyper-frames corresponding to the extended DRX cycle is indicated by "$T_{eDRX}$", and the value based on the value unique to the UE 100 is indicated by "α", the third calculation formula is defined by Formula (3) below.

$$\text{H-SFN mod } T_{eDRX} = \alpha \text{ mod } T_{eDRX} \quad (3)$$

Here, "α" may be a value of a remainder obtained by dividing a value unique to the UE 100 by the upper limit number (for example, 256) of the hyper-frame number. The value unique to UE 100 may be IMSI. That is, if the upper limit number of the hyper-frame numbers is indicated by "H-SFN upper bound", "α" is determined by the calculation formula of IMSI mod (H-SFN upper bound).

However, "α" may be determined without using "H-SFN upper bound". In addition, "α" may be a value that the eNB 200 can grasp and may be a value (for example, a pseudo random number having regularity, or the like) that can give a variation among the UEs, and may be limited to the above specific example. In addition, "α" may be the IMSI without using "H-SFN upper bound".

Modification of Sixth Embodiment

In the modification of the sixth embodiment, a network apparatus is the eNB 200. If a plurality of paging frames (PF) are determined by using the first calculation formula, the eNB 200 transmits the paging only in the first PF among the plurality of PFs within the paging hyper-frame (PH) determined by using the third calculation formula.

In the modification of the sixth embodiment, if a plurality of PFs are determined by using the first calculation formula, the UE 100 receives (monitors) the paging only in the first PF among the plurality of PFs within the PH determined by using the third calculation formula.

For example, as illustrated in FIG. 16, if PFm, PF(m+1), . . . are included in PHn and PFm is the first PF in PHn, the eNB 200 transmits the paging in PFm and does not transmit the paging in PF(m+1), . . . . Here, the eNB 200 transmits the paging in one or more POs in the PFm. The UE 100 receives (monitors) the paging in PFm and does not receive (monitor) the paging in PF(m+1), . . . . Here, the UE 100 receives (monitors) the paging in one PO within the PFm.

Therefore, according to the modification of the sixth embodiment, it is possible to obtain the effect of further power consumption reduction by limiting the PF used for transmission and reception of the paging in each PH. In addition, it is possible to transmit and receive the paging at an earlier stage by transmitting and receiving the paging only in the first PF among the plurality of PFs in each PH.

However, instead of limiting the PF, which is to transmit and receive the paging, to the first PF among the plurality of PFs in each PH, it may be limited to the second PF or even to the last PF. In other words, the PF, which is to transmit and receive the paging, may be limited to a specific one of the plurality of PFs in each PH.

Seventh Embodiment

In the seventh embodiment, differences from the first to sixth embodiments will be described below. In the seventh embodiment, the idle mode eDRX of the H-SFN base described in the sixth embodiment is mainly assumed.

Since the UE 100 that performs the eDRX operation can turn off the receiving set for a long time, a synchronization error between the UE 100 and the network may occur due to a clock error of the UE 100. On the other hand, in order to compensate for the clock error of the UE 100, the repeated transmission (repetition) of the paging as described above is performed.

However, a method of determining the number of repeated transmissions of paging (hereinafter referred to as "paging repetition number") and the period of repeated transmissions of paging (hereinafter referred to as "paging repetition period") is unclear. The paging repetition period corresponds to the above-described paging transmission window (PTW).

In the seventh embodiment, an operation for appropriately determining at least one of the paging repetition number and the paging repetition period will be described.

(1) Radio Terminal According to Seventh Embodiment

Figure 17:
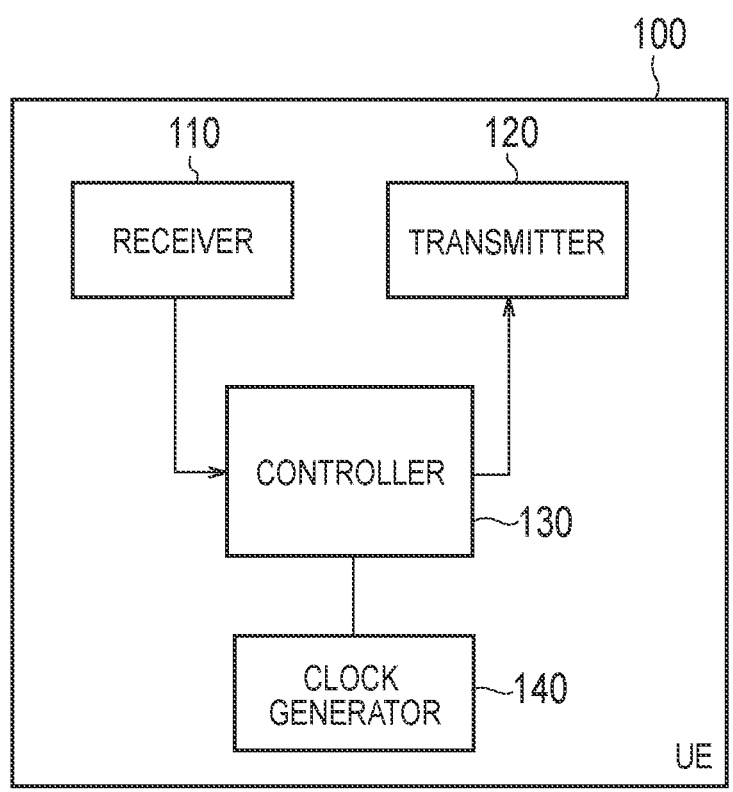
FIG. 17 is a block diagram of a UE according to a seventh embodiment.

FIG. 17 is a block diagram of a UE 100 (radio terminal) according to a seventh embodiment. As illustrated in FIG. 17, the UE 100 includes a clock generator 140 configured to generate an operation clock of the UE 100. The clock generator 140 includes an oscillator such as a crystal oscillator.

In the seventh embodiment, the controller 130 notifies the network of accuracy information about the clock accuracy of the clock generator 140 (hereinafter referred to as "clock accuracy information"). Here, the "network" may be the eNB 200 or the MME 300C. Hereinafter, an example in which the UE 100 notifies the clock accuracy information to the MME 300C will mainly be described.

The "clock accuracy" is, for example, frequency accuracy, and can be expressed in parts per million (PPM). In addition, the clock accuracy information may be a class of clock accuracy. For example, class 1 is less than 50 [ppm] and class 2 is 50 to 100 [ppm]. Each class indicates a constant PPM range. Alternatively, the clock accuracy information may be a statistical value related to the clock accuracy. For example, the clock accuracy information may be an average value of the clock accuracy or a worst value (guaranteed value) of the clock accuracy.

In the seventh embodiment, the clock accuracy information is used by the network to determine at least one of the paging repetition number and the paging repetition period for the UE 100. Therefore, the network (MME 300C) can determine the paging repetition number and the paging repetition period in consideration of the clock accuracy of the UE 100. Therefore, at least one of the paging repetition number and the paging repetition period can be appropriately determined.

The controller 130 may notify the network of the clock accuracy information as a part of the capability information indicating the capability of the UE 100. The capability information is, for example, "UE-EUTRA-Capability" that is one type of RRC signaling. The controller 130 may transmit capability information including clock accuracy information to the network in response to a request from the network.

In addition, the controller 130 may notify the network of the clock accuracy information when notifying the network of allowable latency information indicating the allowable latency of the application executed by the UE 100. Here, the "allowable latency" indicates the maximum allowable time until the UE 100 resumes communication (receives downlink data) from the time when the UE 100 stops communication for power saving. Alternatively, the "allowable latency" may be the maximum allowable time until a corresponding response is received from a counterpart from the time when a certain application transmits a message to the counterpart. It is noted that the allowable latency may be referred to as "maximum response time" or "maximum latency". The controller 130 notifies, for example, an application server of the allowable latency information. Alternatively, the controller 130 may use a value determined for an application layer (for example, for each application) as the allowable latency information, and the value may be determined by negotiation between the UE side application (client) and the corresponding server side application.

Further, the controller 130 may further notify the network of at least one of the paging repetition number and the paging repetition period required for the allowable latency. For example, if the allowable latency is long, the set value of the eDRX cycle can also be lengthened, and thus the repetition number and period based on the eDRX cycle are notified. In other words, if it is in the sleep state for a long time, there is a shift in the time to wake up according to the clock accuracy. Thus, twice repetition is performed for 1 hour, and 12 times repetition is performed for 6 hours. For example, the controller 130 notifies the application server or the MME 300C of at least one of the paging repetition number and the paging repetition period required for the allowable latency.

(2) Network Apparatus According to Seventh Embodiment

The MME 300C (network apparatus) according to the seventh embodiment includes a controller 320 configured to receive the clock accuracy information transmitted from the UE 100 and determine at least one of the paging repetition number and the paging repetition period for the UE 100 based on the clock accuracy information (see FIG. 5). For example, the controller 320 increases the paging repetition number and/or extends the paging repetition period according to the low clock accuracy of the UE 100. In addition, the controller 130 reduces the paging repetition number and/or shortens the paging repetition period according to the high clock accuracy of the UE 100.

In the seventh embodiment, the controller 320 determines at least one of the paging repetition number and the paging repetition period based on the clock accuracy information and the eDRX cycle configured to the UE 100. For example, the controller 320 determines at least one of the paging repetition number and the paging repetition period by multiplying the clock accuracy information by the eDRX cycle (for example, 3 [H]).

The controller 320 may determine at least one of the paging repetition number and the paging repetition period based on the clock accuracy information, the eDRX cycle, and the synchronization accuracy between cells in the network. In this case, the controller 320 increases the paging repetition number and/or extends the paging repetition period according to, for example, low synchronization accuracy between the cells. In addition, the controller 320 reduces the paging repetition number and/or shortens the paging repetition period according to high synchronization accuracy between the cells. It is noted that the controller 320 may acquire information indicating synchronization accuracy between the cells from the eNB 200 or an operation administration and maintenance (OAM) device. The paging repetition number or period may be configured to each UE, may be configured to each cell, or may be commonly configured to the UE and network.

If at least one of the paging repetition number and the paging repetition period necessary for the allowable latency is notified from the UE 100, the controller 320 may determine at least one of the paging repetition number and the paging repetition period for the UE 100 also in consideration of the notice.

Then, the controller 320 notifies the eNB 200 of at least one of the paging repetition number and the paging repetition period. When the paging message (S1 paging message) to the UE 100 is transmitted to the eNB 200, the controller 320 may include at least one of the paging repetition number and the paging repetition period to the UE 100 in the paging message. In addition, the controller 320 may notify the UE 100 of at least one of the paging repetition number and the paging repetition period by a NAS message.

(3) Example of Operation Sequence

FIG. 18 is a diagram illustrating an example of an operation according to the seventh embodiment. The signaling indicated by the dashed line in FIG. 18 means that it is optional.

As illustrated in FIG. 18, in step S701, the eNB 200 transmits, to the MME 300C, information indicating synchronization accuracy between cells. The MME 300C receives information indicating the synchronization accuracy between the cells.

In step S702, the UE 100 notifies the clock accuracy information to the MME 300C. The UE 100 may transmit the clock accuracy information to the eNB 200, and the eNB 200 may transmit the clock accuracy information to the MME 300C, so as to notify the MME 300C of the clock accuracy information.

In step S703, the MME 300C determines at least one of the paging repetition number and the paging repetition period based on the clock accuracy information, the eDRX cycle, and the synchronization accuracy between the cells.

In step S704, the MME 300C notifies the UE 100 of at least one of the paging repetition number and the paging repetition period. Here, the MME 300C may also notify the UE 100 of configuration information of eDRX (eDRX cycle or the like). The UE 100 stores the information notified from the MME 300C and uses the stored information at the time of paging reception.

After that, in step S705, the MME 300C transmits, to the eNB 200, a paging message (S1 paging message) addressed to the UE 100 according to the necessity of paging for the UE 100. Specifically, the MME 300C transmits the paging message addressed to the UE 100 to the eNB 200 that manages the cells constituting a tracking area where the UE 100 exists. Here, the MME 300C includes at least one of the paging repetition number and the paging repetition period determined in step S703 in the paging message. The eNB 200 receives the paging message from the MME 300C.

In step S706, the eNB 200 performs repeated transmission (repetition) of the paging according to at least one of the paging repetition number and the paging repetition period included in the paging message.

As described above, according to the seventh embodiment, the MME 300C can appropriately determine at least one of the paging repetition number and the paging repetition period in consideration of the clock accuracy of the UE 100.

Although an example using the paging message is illustrated in step S705, the present disclosure is not limited thereto. In particular, if the paging repetition number or period is configured in cell units or network units (that is, if there is no individual configuration value for each UE), the paging repetition number or period may be notified between the MME 300C and the eNB 200 by using a non-UE-specific message such as S1 SETUP, eNB Configuration Update, or MME configuration update. In addition, the eNB 200 may notify the UE 100 of the paging repetition number or period by system information block (SIB) or the like.

Modification of Seventh Embodiment

In the seventh embodiment, an example in which the MME 300C determines at least one of the paging repetition number and the paging repetition period has been described. However, instead of the MME 300C, the eNB 200 may determine at least one of the paging repetition number and the paging repetition period. The eNB 200 determines at least one of the paging repetition number and the paging repetition period based on at least the clock accuracy of the UE 100, instead of the MME 300C.

Eighth Embodiment

In the eighth embodiment, differences from the first to seventh embodiments will be described below. In the eighth embodiment, the idle mode eDRX of the H-SFN base described in the sixth embodiment is mainly assumed.

The eighth embodiment is an embodiment according to the modification of the fifth embodiment. In the fifth embodiment, if the UE 100 exists in a cell in which the eDRX operation is not supported, that is, if the eNB 200 that manages the cell does not support the eDRX, the UE 100 stops the eDRX operation and applies the normal DRX operation.

However, when the eDRX operation is stopped, the power saving effect by the eDRX cannot be obtained. In addition, if the UE 100 stops the eDRX operation without notifying the MME 300C of the eDRX application cancellation, the MME 300C continues the paging process to the eDRX. Under such circumstances, when the UE 100 performs the normal DRX operation, the UE 100 wakes up more than necessary, which is not preferable from the viewpoint of power saving.

(1) Radio Terminal According to Eighth Embodiment

The UE 100 (radio terminal) according to the eighth embodiment includes a controller 130 configured to perform, in an idle mode, one of a DRX operation (normal DRX operation) in which an eDRX cycle is not applied (normal DRX operation) and an eDRX operation in which an extended DRX cycle is applied (See FIG. 3). If the UE 100 exists in the area where the eDRX operation is not supported, the controller 130 performs a specific power saving operation configured by the MME 300C (mobility management apparatus), without applying the eDRX operation.

Here, the "area" may be a "cell" or a "tracking area". The tracking area includes a plurality of cells and is a unit of an area where position registration is performed. Each cell broadcasts the identifier of the tracking area to which the cell belongs by SIB or the like. When the tracking area in which the UE 100 exists changes, the controller 130 notifies the MME 300C of the tracking area update (TAU).

In the eighth embodiment, the specific power saving operation configured by the MME 300C is a power saving mode (PSM) specified by the specification of the NAS. In this way, by applying the PSM instead of the normal DRX operation in the area where the eDRX operation is not supported, it is possible to obtain a large power saving effect as compared with the case of performing the normal DRX operation.

The overview of the PSM will be described. First, due to negotiation between the MME 300C and the UE 100, "active timer" (T3324) is configured from the MME 300C to the UE 100. The UE 100 starts an "active timer" upon release of the RRC connection. Like the UE 100, the MME 300C also manages the "active timer". The UE 100 applies the PSM when the "active timer" expires without data communication (for example, paging). Then, when the PSM is applied, the UE 100 starts a timer (T3412) for the PSM. Like the "active timer", the timer (T3412) may also be determined by negotiation. Like the UE 100, the MME 300C also manages the timer (T3412). While the timer (T3412) is running, the UE 100 enters a sleep state (ultra-low power consumption operation). The maximum value of the timer (T3412) is 12.1 days. The UE 100 performs the TAU procedure when the timer (T3412) expires. Therefore, since the power saving operation is performed between the UE 100 and the MME 300C in the PSM, the eNB 200 does not need to perform a special process.

The controller 130 includes an AS entity 100a that communicates with the eNB 200 and a NAS entity 100b that communicates with the mobility management apparatus (see FIG. 19). In the eighth embodiment, the AS entity 100a notifies the NAS entity 100b of whether the area where the UE 100 exists supports the eDRX operation. It is noted that the method of determining whether the area where the UE 100 exists supports the eDRX operation is the same as in the fifth embodiment.

If the UE 100 exists in the area where the eDRX operation is not supported and the eDRX operation is configured to the UE 100, the AS entity 100a notifies the NAS entity 100b that the UE 100 exists in the area where the eDRX operation is not supported. On the other hand, if the eDRX operation is not configured to the UE 100, the AS entity 100a may not notify the NAS entity 100b even if the UE 100 exists in the area where the eDRX operation is not supported. That is, the notification that the UE 100 exists in the area where the eDRX operation is not supported may be limited to the case where the eDRX (cycle) is configured to the UE 100.

The NAS entity 100b performs the first process or the second process if it is notified from the AS entity 100a that the UE 100 exists in the area where the eDRX operation is not supported. The first process is a process of notifying the MME 300C that the UE 100 exists in the area where the eDRX operation is not supported. The second process is a process of requesting the configuration of the PSM to the MME 300C. According to the first process, it is possible to urge the MME 300C to configure the PSM. According to the second process, it is possible to request the MME 300C to configure the PSM. In the first process or the second process, the request value of the above-mentioned timer (T3324, T3412) or the information necessary for the configuration may be notified to the MME 300C. From the viewpoint of the AS entity 100a, it is possible to expect configuration of the PSM by the NAS entity 100b by notifying the NAS entity 100b that the UE 100 exists in the area where the eDRX operation is not supported.

The NAS entity 100b may perform the first process or the second process when the tracking area update (TAU) is notified to the MME 300C. Such an operation is particularly suitable when the presence or absence of the support of the eDRX operation is configured in units of tracking areas. Specifically, if the AS entity 100a determines that the UE 100 exists in the tracking area where the eDRX operation is not supported, the AS entity 100a includes a notification by the first process or a request by the second process in the TAU message.

The above operation is based on the assumption that the PSM is not yet configured to the UE 100. However, if the PSM is already configured to the UE 100, the following operation is performed.

If the UE 100 exists in the area where the eDRX operation is supported and the PSM is configured to the UE 100, the AS entity 100a notifies the NAS entity 100b that the UE 100 exists in the area where the eDRX operation is supported. On the other hand, when the PSM is not configured to the UE 100, the AS entity 100a may not notify the NAS entity 100b even if the UE 100 exists in the area where the eDRX operation is supported. That is, the notification that the UE 100 exists in the area where the eDRX operation is supported may be limited to only the case where the PSM is configured to the UE 100.

The NAS entity 100b may perform a third process or a fourth process if it is notified from the AS entity 100a that the UE 100 exists in the area where the eDRX operation is supported. The third process is a process of notifying the MME 300C that the UE 100 exists in the area where the eDRX operation is supported. The fourth process is a process of requesting the configuration of the eDRX operation to the MME 300C. According to the third process, it is possible to prompt the MME 300C to determine which of the PSM and the eDRX operation is appropriate. According to the fourth process, it is possible to request the MME 300C to configure the eDRX. In the third process or the fourth process, the request value of the eDRX cycle, the requested value of the paging repetition time and period, the requested value of the allowable latency, and the like, or the information necessary for these configurations may be notified to the MME 300C.

The NAS entity 100b may perform the third process or the fourth process when the tracking area update is notified to the MME 300C. Such an operation is particularly suitable when the presence or absence of the support of the eDRX operation is configured in units of tracking areas. Specifically, if the AS entity 100a determines that the UE 100 exists in the tracking area where the eDRX operation is supported, the AS entity 100a includes a notification by the third process or a request by the fourth process in the TAU message.

(2) Example of Operation Sequence

FIG. 19 is a diagram illustrating an example of an operation according to the eighth embodiment. The process and the signaling indicated by the dashed line in FIG. 19 mean that it is optional.

As illustrated in FIG. 19, in step S801, the AS entity 100a confirms whether eDRX or PSM is configured.

If the eDRX or the PSM is configured (step S801: Yes), in step S802, the AS entity 100a receives a specific SIB (or MIB) from a cell (eNB 200) in which the UE 100 exists.

In step S803, the AS entity 100a checks whether H-SFN is included in the received specific SIB (or MIB).

If the H-SFN is not included in the specific SIB (or MIB) (step S803: No), the AS entity 100a determines that the cell does not support the eDRX operation, and in step S805, the AS entity 100a notifies the NAS entity 100b that the UE 100 exists in a cell in which the eDRX operation is not supported (out of eDRX supporting cell).

On the other hand, if the H-SFN is included in the received specific SIB (or MIB) (step S803: Yes), the AS entity 100a determines that the cell supports the eDRX operation, and in step S804, the AS entity 100a notifies the NAS entity 100b that the UE 100 exists in a cell in which the eDRX operation is supported (eDRX supporting cell).

In step S806, the NAS entity 100b confirms whether eDRX or PSM is configured.

If the eDRX or the PSM is configured (step S806: Yes), in step S807, the NAS entity 100b performs an appropriate process among the above-described first to fourth processes. A notification or a request by this process may be transmitted to the MME 300C by a TAU message.

In step S808, the MME 300C chooses the eDRX or the PSM in response to a notification or request from the NAS entity 100b. In addition, the MME 300C determines a configuration for the power saving operation chosen among the eDRX and the PSM.

In step S809, the MME 300C performs reconfiguration of the selected power saving operation chosen among the eDRX and the PSM with respect to the NAS entity 100b.

Modification of Eighth Embodiment

In the eighth embodiment, an example in which the specific power saving operation configured by the MME 300C is the PSM has been described. However, the specific power saving operation configured by the MME 300C is not limited to the PSM.

In the present modification, the specific power saving operation configured by the MME 300C is a special DRX operation using a special DRX cycle different from the eDRX cycle and the normal DRX cycle. The special DRX cycle is configured by the MME 300C. The special DRX cycle may be longer than the normal DRX cycle and shorter than the eDRX cycle. In this way, by applying the special DRX operation rather than the normal DRX operation in the area where the eDRX operation is not supported, it is possible to obtain a large power saving effect as compared with the case of performing the normal DRX operation.

The special DRX operation enables the longer DRX cycle (special DRX cycle) than the normal DRX operation, without using H-SFN. The special DRX cycle is defined as, for example, a timer value, and the timer value is shared by the UE 100 and the MME 300C. The UE 100 enters a sleep state while the timer is running. When transitioning to the sleep state in the area where the eDRX operation is not supported, the UE 100 starts application of the special DRX cycle by activating the timer. The UE 100 wakes up when the timer expires.

It is noted that the special DRX cycle may be configured in units of tracking areas. For example, if the support or non-support of the eDRX is managed in units of tracking areas, such as an eDRX support tracking area and an eDRX unsupported tracking area, the configuration value of the special DRX cycle from the MME 300C is previously notified to the UE 100 in units of tracking areas. Therefore, the UE 100 can start application of the special DRX cycle in the tracking area, without performing new configuration in particular. In this case, for some of the tracking areas, it may be configured such that the normal DRX cycle is applied.

Other Embodiments

The above-described embodiments can be implemented not only separately and independently but also in combination of two or more embodiments. For example, a part of one embodiment may be combined with a part of the other embodiments.

In each embodiment described above, the LTE system has been exemplified as the mobile communication system. However, the present disclosure is not limited to the LTE system. The present disclosure may be applied to mobile communication systems other than the LTE system.

[Additional Note 1]

1. Introduction

In RAN2#90, the discussion on RAN enhancements for extended DRX in LTE was kicked off and the outline of idle mode extended DRX (eDRX) was agreed as follows [1];

Agreements:

For idle mode, RAN2 agrees that the DRX should be extended past the current SFN limit of 10.24 s. From RAN2 point of view we see power consumption benefits of increasing the DRX cycle in order of minutes. How many minutes it is FFS. [ . . . ]

For idle mode:

FFS how the UE determines when to wake up (either using hyper SFN or timer based mechanisms). Once the UE wakes up the UE determines the PF/PO based on the legacy DRX formula/cycle (i.e. no change on the paging occasion computation). To improve paging reliability, the paging message can be repeated on different the paging occasions determined using the legacy DRX formula for a certain time window. FFS how the UE determines for how long to monitor for paging messages.

In this additional note, the idle mode behaviour of UE configured with extended DRX cycle is discussed.

2. Discussion 2.1. Configuration of eDRX

According to the technical report in SA2, it was concluded that the NAS MM messages are used for the idle mode eDRX value assignment, i.e., 5.1.1 Solution #1: Extended DRX value assignment using NAS MM messages. From the UE behaviour point of view, the UE should apply the idle mode eDRX operation into the paging reception procedure when the AS is assigned with the idle mode eDRX value by the NAS.

The idle mode UE should apply the extended DRX into the paging reception procedure when the AS is assigned with the extended DRX value by the NAS.

In the actual operation with eDRX, the UE needs to determine the PF/PO based on the legacy DRX formula/cycle when it wakes up. So, the UE should know the legacy DRX parameters in addition to the extended DRX value. In the current specification, the legacy DRX parameters, especially for DRX cycle, could be configured by either the NAS or the eNB, and T is determined by the shortest of the DRX cycles. While it's natural to assume the CN-specific DRX cycle is simply extended to provide the extended DRX cycle exclusively, it's actually up to the other working group how it should be defined and therefore it's unclear if the current IDLE mode specification will still work well if the changes are applied in the specifications of other working groups. On the other hand, assuming the legacy PF/PO is used for repetition of the paging message to improve paging reliability, the legacy DRX parameters which are used to determine the legacy PF/PO could be considered as RAN-specific configurations. So, for the determination of the legacy PF/PO, the UE should only use the DRX parameters provided in SIB, i.e., pcch-Config. In other words, the specifications should be defined to ensure that the (extended) DRX parameters provided by the MME should be ignored for the legacy PF/PO calculation and should only be taken into account in the extended DRX-specific procedure. This assumption is consistent with the current specification if the MME only provides the extended DRX cycle as the CN-specific DRX cycle.

When the extended DRX is applied, the legacy PF/PO should be calculated with the PCCH Configuration provided in SIB, regardless of whether any configurations are provided by the MME.

With regards to the defaultPagingCycle in pcch-Config, the range of value is from rf32 to rf256. Although it might be already implied in the agreement, it should be clarified that the range of value for the defaultPagingCycle does not need to be extended for eDRX since the purpose of the IE is just for the calculation of legacy PF/PO as suggested in Proposal 2.

It should be clarified that the range of the existing defaultPagingCycle does not need to be extended.

2.2. Paging Reception Procedure 2.2.1. Legacy PF/PO Related Operations

It's obvious that the motivation to introduce eDRX is to reduce the UE power consumption. Thus, the period/number of wake-ups for paging reception should be minimized. In the current specification, the UE needs to only monitor one PO per DRX cycle. Even for idle mode with eDRX, the same principle should be applied to maximize the power reduction gain, while the paging message can be repeated for a certain window. For example, if the window is set to 10.24 and defaultPagingCycle is configured with rf256, the number of paging occasions within the window is four, i.e., the eNB may repeat the paging message transmissions 4 times if S1 PAGING is received in advance. From the UE's perspective, it should be sufficient to wake up once within the window, i.e., in only one subframe of the paging occasions. If the paging is not transmitted/received in a paging occasion, the UE may go to sleep immediately after the single paging occasion. It should be up to UE implementation when/how to obtain SIB in advance of the paging reception when SIB update occurs. The UE should only be required to monitor one legacy paging occasion within a certain window per extended DRX cycle, when it wakes up from extended sleep.

With regards to the number of paging repetitions, it is pointed out that the maximum time drifting of UE is 180 [ms], i.e., 18 radio frames, with 50 [ppm] clock drift, even if the extended DRX cycle is assumed to be 1 hour. It is still within the minimum value of defaultPagingCycle, i.e., rf32. So, if the paging message is repeated in at least one paging occasion to cover the worst case time drift in the UE.

The clock drift of UE with 1 hour eDRX cycle can be tolerable by the repetition of paging message in at least one paging occasion.

However, other factors may potentially affect the paging reliability, such as SFN mis-alignment among eNBs, latency of S1 interface, SI scheduling and so on. Since these factors cannot be accounted for by the UE, the NW should take this into account and facilitate the UE's paging reception when it wakes up, e.g., by increasing the number of paging repetition or applying an offset to the paging start.

The NW should adjust the paging occasions/repetitions to the UE's wake up timing to ensure sufficient paging reliability.

If agreeable, the UE only needs to wake up when it thinks the concerned paging occasion comes. So, the UE does not need to be informed of the window.

The UE does not need to be aware of the window in which the paging message may be repeated.

2.2.2 Determination of eDRX Cycle

One of the main unresolved issues is to conclude whether the eDRX cycle is determined by the hyper-SFN mechanism or the timer-based mechanism. The pros and cons of both mechanisms were discussed extensively. The hyper-SFN mechanism will offer more paging capacity due to its deterministic paging occasions, but this would require network synchronization among eNBs. On the other hand, the timer-based mechanism may work even with the legacy and/or unsynchronized eNBs, while it may need more standardization and/or implementation efforts since it's a new concept including a new UE behaviour.

From the NW implementation perspective, Rel-13 has already decided to introduce the new NW behaviour, i.e., the paging message repetition. However legacy eNBs may not cannot be used to ensure paging reliability, since paging repetition was not supported in many NW implementations, even though it was not explicitly prohibited in the current specification. So, legacy eNBs may need to be upgraded to support eDRX functionality to ensure sufficient paging reliability, regardless of whether the hyper-SFN mechanism or the timer-base mechanism is introduced.

Legacy eNB implementation may not ensure sufficient paging reliability even if the timer-based mechanism is applied.

From the UE implementation's perspective, an internal timer is used to determine when it should wake up, i.e., the UE runs the timer during sleep, and when the timer expires the UE considers that an eDRX cycle is completed. It can avoid unnecessary wake-up to check/synchronize with system parameters in an eDRX cycle, thus the power consumption may be minimized. The current UE implementation is more aligned with the timer-based mechanism. So, the timer-based mechanism may be a simpler mechanism for the UE as long as the network ensures the synchronization towards the UE including the adjustment of paging. The current UE implementation is well aligned with the timer-based mechanism.

[Additional Note 2]

1. Introduction

In RAN2#90, the discussion on RAN enhancements for extended DRX in LTE was kicked off and the outline of idle mode extended DRX (eDRX) was agreed as follows;

Agreements: For idle mode, RAN2 agrees that the DRX should be extended past the current SFN limit of 10.24 s. From RAN2 point of view we see power consumption benefits of increasing the DRX cycle in order of minutes. How many minutes it is FFS. [ . . . ]

For idle mode: FFS how the UE determines when to wake up (either using hyper SFN or timer based mechanisms). Once the UE wakes up the UE determines the PF/PO based on the legacy DRX formula/cycle (i.e. no change on the paging occasion computation). To improve paging reliability, the paging message can be repeated on different the paging occasions determined using the legacy DRX formula for a certain time window. FFS how the UE determines for how long to monitor for paging messages.

In the following RAN2#91, the significant progress with basic assumptions for eDRX was done;

Agreements

To improve power saving gains, the UE should be able to re-synchronize over Uu with the RAN without sending uplink signalling (i.e. H-SFN or time clock broadcast information).

H-SFN based paging will be adopted in the RAN

RAN2 has agreed that it would be desirable to minimize or avoid storing paging messages in eNB. To avoid storing of paging message would require the MME to have some awareness of approximate time of when the UE will become reachable. It is up to SA2 how this is achieved.

For paging robustness purposes for mobile UEs, some lose H-SFN synchronization between cells may be required In addition, the email discussion between RAN2#91 and #91bis would discuss on the ranges of eDRX and H-SFN and how to handle SI update. In this additional note, the other aspects which are not discussed so far but also important for idle mode UE behaviour are considered.

2. Discussion 2.1. Configuration of eDRX

According to the technical report in SA2, it was concluded that the NAS MM messages are used for the idle mode eDRX value assignment, i.e., 5.1.1 Solution #1: Extended DRX value assignment using NAS MM messages in [3]. From the UE behaviour point of view, the UE should apply the idle mode eDRX operation into the paging reception procedure when the AS is assigned with the idle mode eDRX value by the NAS.

Proposal 1: The idle mode UE should apply the extended DRX into the paging reception procedure when the AS is assigned with the extended DRX value by the NAS.

In the actual operation with eDRX, the UE needs to determine the PF/PO based on the legacy DRX formula/cycle when it wakes up. So, the UE should know the legacy DRX parameters in addition to the extended DRX value. In the current specification, the legacy DRX parameters, especially for DRX cycle, could be configured by either the NAS or the eNB, and T is determined by the shortest of the DRX cycles. While it's natural to assume the CN-specific DRX cycle is simply extended to provide the extended DRX cycle exclusively, it's actually up to the other working group how it should be defined and therefore it's unclear if the current IDLE mode specification will still work well if the changes are applied in the specifications of other working groups. On the other hand, assuming the legacy PF/PO is used for repetition of the paging message to improve paging reliability, the legacy DRX parameters which are used to determine the legacy PF/PO could be considered as RAN-specific configurations. So, for the determination of the legacy PF/PO, the UE should only use the DRX parameters provided in SIB, i.e., pcch-Config. In other words, the specifications should be defined to ensure that the (extended) DRX parameters provided by the MME should be ignored for the legacy PF/PO calculation and should only be taken into account in the extended DRX-specific procedure. This assumption is consistent with the current specification if the MME only provides the extended DRX cycle as the CN-specific DRX cycle.

Proposal 2: When the extended DRX is applied, the legacy PF/PO should be calculated with the PCCH Configuration provided in SIB, regardless of whether any configurations are provided by the MME.

With regards to the defaultPagingCycle in pcch-Config, the range of value is from rf32 to rf256. Although it might be already implied in the agreement, it should be clarified that the range of value for the defaultPagingCycle does not need to be extended for eDRX since the purpose of the IE is just for the calculation of legacy PF/PO.

Proposal 3: It should be clarified that the range of the existing defaultPagingCycle does not need to be extended.

2.2. Paging Reception Procedure
2.2.1. Legacy PF/PO Related Operations

Currently it's still FFS on "how the UE determines for how long to monitor for paging messages". From the perspective that the motivation to introduce eDRX is to reduce the UE power consumption, the period/number of wake-ups for paging reception should be minimized. In the current specification, the UE needs only to monitor one PO per DRX cycle. Even for idle mode with eDRX, the same principle should be applied to maximize the power reduction gain, while the paging message can be repeated for a certain window. For example, if the window is set to 10.24 [s] and defaultPagingCycle is configured with rf256, the number of paging occasions within the window is four, i.e., the eNB may repeat the paging message transmissions 4 times if S1 PAGING is received in advance. From the UE's perspective, it should be sufficient to wake up once within the window, i.e., in only one subframe of the paging occasions. If the paging is not transmitted/received in a paging occasion, the UE may go to sleep immediately after the single paging occasion. It should be up to UE implementation when/how to re-synchronize with RAN to receive the paging message successfully.

Proposal 4: The UE should only be required to monitor one legacy paging occasion within a certain window per extended DRX cycle, when it wakes up from extended sleep.

With regards to the number of paging repetitions, it is pointed out that the maximum time drifting of UE is 180 [ms], i.e., 18 radio frames, with 50 [ppm] clock drift, even if the extended DRX cycle is assumed to be 1 hour. It is still within the minimum value of defaultPagingCycle, i.e., rf32. So, if the paging message is repeated in at least one paging occasion to cover the worst case time drift in the UE.

Observation 1: The clock drift of UE with 1 hour eDRX cycle can be tolerable by the repetition of paging message in at least one paging occasion.

However, other factors may potentially affect the paging reliability, such as SFN mis-alignment among eNBs, latency of S1 interface, SI scheduling and so on. Since these factors cannot be accounted for by the UE, the NW should take this into account and facilitate the UE's paging reception when it wakes up, e.g., by increasing the number of paging repetition or applying an offset to the paging start.

Proposal 5: The NW should adjust the paging occasions/repetitions to the UE's wake up timing to ensure sufficient paging reliability.

If agreeable, the UE only needs to wake up when it thinks the concerned paging occasion comes. So, the UE does not need to be informed of the window.

Proposal 6: The UE does not need to be aware of the window in which the paging message may be repeated.

2.2.2. H-SFN PF Determination

The outlines of H-SFN based paging were already proposed and it could be considered as conceptually the same mechanism on how to determine the paging H-SFN frames (PH), compared to the legacy PF. Considering the legacy PF/PO is reused within a PH [1], the formula to determine PH should be separately defined.

Proposal 7: The formula to determine the paging H-SFN frames should be separately defined from the legacy PF/PO calculation.

Based on the legacy PF formula, "SFN mod T=(T div N)*(UE_ID mod N)", almost all parameters could be applicable to the formula for PH with small re-definition. But it should be considered that N, which is associated with nB to control paging capacity, is no longer necessary. So, PH may be simply determined by;

$$\text{H-SFN mod } T_{eDRX} = \text{IMSI mod } T_{eDRX}$$

where
H-SFN: Paging H-SFN frame number
$T_{eDRX}$: eDRX cycle [H-SFN]; Note that the $T_{eDRX}$ is defined as multiple of 10.24[s]

Once the PH is determined, the legacy PF/PO calculations are used to identify actual paging occasions.

Proposal 8: The paging H-SFN frames should be determined by the fomula reusing the legacy PF formula without supporting nB.

[Additional Note 3]
1. Introduction

In RAN2#91bis, the details of idle mode eDRX was discussed and the agreement was reached as follows;

Agreements:
Idle Mode eDRX
To define the H-SFN as new frame structure on top of legacy SFN structure where each H-SFN value corresponds to a cycle of legacy SFN of 1024 frames
A H-SFN cycle of 10 bits indicating SFN will be adapted, for future proofness.
The maximum I-eDRX cycle is 43.69 min
To define the range of value of I-eDRX cycle as numbers that are a power of two (2n)
RAN2 thinks that ETWS, CMAS, PWS requirement cannot be met when eDRX is configured. We will not optimize to meet the requirement.
For EAB, if the UE supports SIB14, when in I-eDRX, it acquires SIB14 before establishing the RRC connection
To specify H-SFN in SIB1. FFS if the precious bits in the MIB can be used Not to define a default I-eDRX cycle value per eNB; to support implicit I-eDRX support indication thought the inclusion of H-SFN Paging hyper frame (PH) computation should be a function of the extended I-DRX cycle and the IMSI mod (1024). RAN2 assumes that SA2 will work on the details of MME paging strategy based on this formula.

The starting point of the window is designed such that a fair distribution within the H-SFN paging frame. Details of the formula are FFS.

FFS how and who configures the PW

FFS The UE is only required to monitor one of its legacy (PF, PO) during the paging window or whether it monitors the full paging window In this additional note, further details of idle mode eDRX are discussed from UE behaviour point of view.

2. Discussion 2.1. Configuration of eDRX

According to the technical report in SA2, it was concluded that the NAS MM messages are used for the idle mode eDRX value assignment, i.e., 5.1.1 Solution #1: Extended DRX value assignment using NAS MM messages. In addition, it was agreed in RAN2#91bis that "Not to define a default I-eDRX cycle value per eNB". From the UE behaviour point of view, the UE should apply the idle mode eDRX operation into the paging reception procedure when the AS is assigned with the idle mode eDRX value by the NAS.

Proposal 1: The idle mode UE should apply the extended DRX into the paging reception procedure when the AS is assigned with the extended DRX value by the NAS.

In the actual operation with eDRX, the UE needs to determine the PF/PO based on the legacy DRX formula/cycle when it wakes up. So, the UE should know the legacy DRX parameters in addition to the extended DRX value. In the current specification, the legacy DRX parameters, especially for DRX cycle, could be configured by either the NAS or the eNB, and T is determined by the shortest of the DRX cycles. While it's natural to assume the CN-specific DRX cycle is simply extended to provide the extended DRX cycle exclusively, it's actually up to the other working group how it should be defined and therefore it's unclear if the current IDLE mode specification will still work well if the changes are applied in the specifications of other working groups. On the other hand, assuming the legacy PF/PO is used for repetition of the paging message to improve paging reliability as agreed, the legacy DRX parameters which are used to determine the legacy PF/PO could be considered as RAN-specific configurations. So, for the determination of the legacy PF/PO, the UE should only use the DRX parameters provided in SIB, i.e., pcch-Config. In other words, the specifications should be defined to ensure that the (extended) DRX parameters provided by the MME should be ignored for the legacy PF/PO calculation and should only be taken into account in the extended DRX-specific procedure. This assumption is consistent with the current specification if the MME only provides the extended DRX cycle as the CN-specific DRX cycle.

Proposal 2: When the extended DRX is applied, the legacy PF/PO should be calculated with the PCCH Configuration provided in SIB, regardless of whether any configurations are provided by the MME.

It is still "FFS how and who configures the PW". Although the PW mainly aims to account for synchronization among eNBs in this release, the UE clock drifts will be also considerable in future releases since it was agreed that "A H-SFN cycle of 10 bits indicating SFN will be adapted, for future proofness" and the PW for 10 bits H-SFN (about 3 hours) will have to account for 540 [ms] (54 SFNs) of UE clock drifts. Considering the paging repetition will work for compensation of the UE clock drifts between re-synchronizations and the potential loose H-SFN synchronization between cells, it's the future proofing assumption that the MME configures the paging repetition window (PW) since the MME is expected to have the knowledge of synchronization performances in both the UE and eNB. The MME may inform the eNB of the PW configured per UE basis through S1 PAGING message, which will be decided up to the other WG.

Proposal 3: The MME should configure the paging window (PW).

2.2. Entering/Leaving Conditions to/from eDRX

It was discussed and agreed that "to support implicit I-eDRX support indication thought the inclusion of H-SFN", but the details on what the UE behaviour is expected have not been discussed yet. The agreement implies that the UE is able to know whether a cell supports eDRX or not by whether the cell broadcasts H-SFN. Two cases may be considered for how the UE detects that the cell does not support eDRX:

Case 1: Just after the UE wakes up from eDRX.

Case 2: Just before the UE goes to sleep to eDRX.

For both cases, the UE cannot synchronize with H-SFN since it's not broadcasted, i.e., the UE does not know which H-SFN the UE is supposed to be aligned to. In addition, for case 2, the UE cannot expect that H-SFN will be broadcasted when it wakes up at the next time. So, the UE should check the availability of H-SFN when it wakes up/goes to sleep from/to eDRX.

Proposal 4: The UE should check whether H-SFN is broadcasted after it wakes up from eDRX and before it goes to sleep to eDRX.

If the UE detects that the serving cell does not broadcast H-SFN, it's straight forward for the UE to fall back to the legacy DRX operation, i.e., do not apply eDRX. This will ensure that the UE will not miss a page even without H-SFN synchronization.

Proposal 5: The UE should not apply the eDRX operation, i.e., just follow the legacy DRX, when it does not detect H-SFN broadcasted from the serving cell.

However, Proposal 5 means that it could be no longer expected for the UE to have the power saving gain from eDRX. In addition, the paging message does not come from the MME for a certain long duration although the UE falls back to the legacy DRX operation, since the MME may continue to apply the paging strategy for eDRX, i.e., based on the agreement "To avoid storing of paging message would require the MME to have some awareness of approximate time of when the UE will become reachable. It is up to SA2 how this is achieved". So, it's beneficial for the UE in non-eDRX supporting cell to be configured with the power saving mode (PSM) by the MME as soon as possible, instead of eDRX, in order to save the power consumption.

Observation 1: It's beneficial for the UE cannot apply eDRX operation to be reconfigured with PSM as soon as possible.

From the AS's point of view, when the UE does not detect H-SFN in SIB1 of the serving cell, the NAS should be informed of this condition in order to assist the upper layer to change the configuration from eDRX to PSM. Similarly, the AS may assist the upper layer in making the decision to reconfigure from PSM to eDRX.

Proposal 6: The AS should inform the NAS of whether the current camped cell supports eDRX or not, when the UE is configured with eDRX (and possibly with PSM).

2.3. Paging Reception Procedure 2.3.1. Legacy PF/PO Related Operations

Currently it's still FFS that "The UE is only required to monitor one of its legacy (PF, PO) during the paging window or whether it monitors the full paging window". From the perspective that the motivation to introduce eDRX is to reduce the UE power consumption, the period/number of wake-ups for paging reception should be minimized. In the current specification, the UE needs only to monitor one PO per DRX cycle. Even for idle mode with eDRX, the same principle should be applied to maximize the power reduction gain, while the paging message can be repeated for a certain window.

Proposal 7: The UE should only be required to monitor one legacy paging occasion within a certain window per extended DRX cycle, when it wakes up from extended sleep.

2.3.2. H-SFN PF Determination

It was agreed that "Paging hyper frame (PH) computation should be a function of the extended I-DRX cycle and the IMSI mod(1024). RAN2 assumes that SA2 will work on the details of MME paging strategy based on this formula". Considering the legacy PF/PO is reused within a PH, the formula to determine PH should be separately defined.

Proposal 8: The formula to determine the paging hyper frames (PH) should be separately defined from the legacy PF/PO calculation.

Based on the legacy PF formula, "SFN mod T=(T div N)*(UE_ID mod N)", almost all parameters could be applicable to the formula for PH with small re-definition. But it should be considered that N, which is associated with nB to control paging capacity, is no longer necessary. So, PH may be simply determined by;

$$\text{H-SFN mod } T_{eDRX} = (\text{IMSI mod } 1024) \text{ mod } T_{eDRX}$$

where
H-SFN: Paging H-SFN frame number
$T_{eDRX}$: eDRX cycle [H-SFN]; Note that the $T_{eDRX}$ is defined as multiple of 10.24[s]

Once the PH is determined, the legacy PF/PO calculations are used to identify actual paging occasions.

Proposal 9: The paging H-SFN frames should be determined by reusing the formula from the legacy PF calculation without supporting nB.

The invention claimed is:

1. A mobile communication system, comprising:
a radio terminal configured to perform a process of receiving a system information block from a base station after an idle mode extended DRX is configured by a mobility management apparatus to the radio terminal,
wherein, if the base station supports an idle mode extended DRX, the system information block includes information indicating that the base station supports the idle mode extended DRX, and
if the base station does not support the idle mode extended DRX, the radio terminal is configured to perform a process of stopping the operation of the idle mode extended DRX configured by the mobility management apparatus.

2. The mobile communication system according to claim 1, wherein
the base station is configured to receive, from the mobility management apparatus, a paging message used for paging of the radio terminal,
wherein the paging message includes a first field for idle mode non-extended DRX and a second field for idle mode extended DRX,
the second field includes first information indicating a DRX cycle of the idle mode extended DRX and second information indicating a paging time window that is a period of repeatedly transmitting the paging, and
if the first information indicating the DRX cycle of the idle mode extended DRX is included in the second field, the controller is configured to determine that the idle mode extended DRX is configured to the radio terminal.

3. The mobile communication system according to claim 2, wherein
the base station is configured to repeatedly transmit the paging based on the paging time window.

4. The mobile communication system according to claim 1, wherein
the mobility management apparatus is configured to transmit, to the base station, a paging message used for paging of a radio terminal,
wherein the paging message includes a first field for idle mode non-extended DRX and a second field for idle mode extended DRX, and
if the idle mode extended DRX is configured to the radio terminal, the mobility management apparatus is configured to include, into the second field, first information indicating a DRX cycle of the idle mode extended DRX and second information indicating a paging time window that is a period of repeatedly transmitting the paging.

5. The mobile communication system according to claim 1, wherein
after configuring the idle mode extended DRX to the radio terminal, the radio terminal is configured to
determine a paging frame that is a radio frame including a paging occasion of the radio terminal and determine a predetermined subframe of the paging frame as the paging occasion, and
determine a paging hyper-frame that is a hyper-frame including the paging frame from a plurality of hyper-frames each including a predetermined number of radio frames, wherein the controller is configured to determine the paging hyper-frame by using a third calculation formula defined separately of a first calculation formula used for determining the paging frame and a second calculation formula used for determining the paging occasion,
when a hyper-frame number of the paging hyper-frame is indicated by "H-SFN", the number of hyper-frame corresponding to the extended DRX cycle is indicated by "$T_{eDRX}$", and a value based on a value unique to the radio terminal is indicated by "$\alpha$", the third calculation formula is H-SFN mod $T_{eDRX} = \alpha$ mod $T_{eDRX}$.

6. The mobile communication system according to claim 5, wherein
a DRX parameter provided by system information from a base station is applied to the first calculation formula and the second calculation formula, and
a predetermined parameter different from the DRX parameter is applied to the third calculation formula, without applying the DRX parameter.

7. The mobile communication system according to claim 6, wherein
the predetermined parameter includes an extended DRX cycle provided from the mobility management apparatus.

8. The mobile communication system according to claim 5, wherein
the unique value is international mobile subscriber identity (IMSI).

9. The mobile communication system according to claim 1, wherein
after the radio terminal transitions to a connected mode, the radio terminal is configured to transmit, to the base station, information for releasing a connection between the radio terminal and the base station if the radio terminal confirms that no communication data of the radio terminal exists.

* * * * *